United States Patent
Shiragaki et al.

(10) Patent No.: US 6,657,952 B1
(45) Date of Patent: Dec. 2, 2003

(54) RING NETWORK FOR SHARING PROTECTION RESOURCE BY WORKING COMMUNICATION PATHS

(75) Inventors: Tatsuya Shiragaki, Tokyo (JP); Naoya Henmi, Tokyo (JP); Makoto Nishio, Tokyo (JP); Hitoshi Takeshita, Tokyo (JP); Hirofumi Shimomura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/200,583

(22) Filed: Nov. 27, 1998

(30) Foreign Application Priority Data

Nov. 28, 1997 (JP) .............................................. 9-327359
Jun. 19, 1998 (JP) ............................................ 10-172997

(51) Int. Cl.[7] .......................... G01R 31/08; H04L 12/28

(52) U.S. Cl. ....................... 370/223; 370/404; 370/244

(58) Field of Search ................................. 370/216, 222, 370/223, 224, 236.2, 225, 227, 228, 242, 241.1, 249, 404, 405, 406, 905, 907, 535–538, 424, 395.42, 395.51, 400, 403; 359/110, 119, 115, 118

(56) References Cited

U.S. PATENT DOCUMENTS

| | | | |
|---|---|---|---|
| 5,159,595 A | | 10/1992 | Flanagan et al. |
| 5,179,548 A | * | 1/1993 | Sandesara .................... 370/406 |
| 5,442,623 A | | 8/1995 | Wu |
| 5,550,805 A | * | 8/1996 | Takatori et al. .............. 370/222 |
| 5,647,035 A | * | 7/1997 | Cadeddu et al. ............. 359/119 |
| 5,760,934 A | * | 6/1998 | Sutter et al. ................. 359/119 |
| 5,793,746 A | * | 8/1998 | Gerstel et al. ............... 370/228 |
| 5,986,783 A | * | 11/1999 | Sharma et al. .............. 359/119 |
| 6,069,719 A | * | 5/2000 | Mizrahi ....................... 359/124 |
| 6,256,292 B1 | * | 7/2001 | Ellis et al. ................... 370/227 |
| 6,456,406 B1 | * | 9/2002 | Arecco et al. ............... 359/119 |

FOREIGN PATENT DOCUMENTS

EP   0716 521 A2   6/1996
JP   6-37779       2/1994

(List continued on next page.)

OTHER PUBLICATIONS

"An Optical Bidirectional Self–Healing Ring with Increased Capacity Using WDM" R. Cadeddu et al., 22nd European Conference on Optical Communication , 1996, pp. 3.257–3.258.

(List continued on next page.)

*Primary Examiner*—Kwang Bin Yao
*Assistant Examiner*—Hanh Nguyen
(74) *Attorney, Agent, or Firm*—Scully, Scott, Murphy & Presser

(57) ABSTRACT

In a ring topology network, a number of nodes interconnect transmission links to form first and second working rings and first and second optical protection rings in a ring topology. Multiple working paths are established on each working ring and multiple protection paths are established on each protection ring corresponding to the working paths. A first working path spans across first and second nodes for transmission of a signal in a first direction of the ring topology, and a second working path of the second working rings spans across the first and second nodes for transmission of a signal in a second direction of the ring topology opposite to the first direction. A first protection path on the first protection ring spans across the first and second nodes for transmission of a signal in the second direction of the ring topology, and a second protection path of the second protection ring spans across the first and second nodes for transmission of a signal in the first direction of the ring topology. The first and second nodes normally use the first and second working paths, respectively. Responsive to a failure of one of the first and second working paths, the first and second nodes use a corresponding one of the first and second protection paths, instead of the failed working path.

18 Claims, 18 Drawing Sheets

FOREIGN PATENT DOCUMENTS

| JP | 6-205028 | 7/1994 |
|---|---|---|
| JP | 7-66821 | 3/1995 |
| JP | 9-509028 | 9/1997 |
| WO | WO 97/01897 | 1/1997 |
| WO | WO 98/47255 | 10/1998 |

OTHER PUBLICATIONS

"Network Operations and Management Issues for Transparent WDM Networks", R.S. Vodhanel, et al., Lasers and Electro–Optics Society Annual Meeting. IEEE, Oct. 31, 1994, pp. 365–366.

"A Uni–Directional Self Healing Ring Using WDM Technique", Erland Almström et al., Proceedings of the European Conference on Optical Communication (ECOC) Firence, Sept. 25–29, 1994 Genova, IIC, IT, vol. 2, Conf. 20, 1994, pp 873–875.

"Multiwavelength Survivable Ring Network Architectures", A.F. Elrefaie, Proceedings of the International Conference on Communications (ICC), Geneva, May 23–26 1993, New York, IEEE, vol 3, May 23, 1993, pp 1245–1251.

"An Optical FDM–Based Self–Healing Ring Network Employing Arrayed Waveguide Grating Filters and EDFA's with Level Equalizers", Hiromu Toba et al. IEEE Journal on Selected Areas in Communication, IEE Inc. New York, vol. 14, No. 5, Jun. 1, 1996, pp 800–813

"Multiwavelength Survivable Ring Network Architectures", A. F. Elrefaie, Proceedings of ICC '93, pp. 1245–1251, 1993.

"An Optical FDM–Based Self–Healing Ring Network Employing Arrayed Waveguide Grating Filters and EDFA's with Level Equalizers", Hiromu Toba et al., IEEE Journal on Selected Areas in Communications, vol. 14 No. 5, pp. 800–813.

* cited by examiner

RING NETWORK FOR SHARING PROTECTION RESOURCE BY WORKING COMMUNICATION PATHS

BACKGROUND OF THE INVENTION

1. Field of the Invention

The present invention relates to generally to self-healing communications networks, and more specifically to a ring topology network which supports multiplex signals on protection communication paths during failures by fast switching from working communication paths.

2. Description of the Related Art

Ring topology networks, particularly, optical ring networks are currently receiving attention because of the number of wavelengths that can be multiplexed onto a single optical link is increasing due to recent innovative techniques. A number of technical publications deal with this topic. A four-fiber ring network is discussed in a technical paper "Multiwavelength Survivable Ring Network Architectures", A. F. Elrefaie, Proceedings of ICC '93, pages 1245–1251, 1993. According to this publication, a loopback fault recovery method is described. In a four-fiber ring network where optical links are interconnected by a number of network nodes so that working rings are formed for transmission of signals in opposite directions of the ring topology and protection rings are formed for transmission of signals in opposite directions of the ring topology. The protection rings respectively correspond to the working rings and the direction of transmission of each protection ring is also opposite to the direction of transmission of the corresponding working ring. Optical paths are established on each of the working and protection rings between network nodes. If a working optical path between source and destination nodes fails, two loopback points are formed, one on each end of the affected link of the working path, for connecting ends of the corresponding protection optical path to unaffected sections of the working path so that a recovery route is established between the source and destination nodes.

Since the loopback points are close to the location of the failure, the recovery route can be quickly established by nodes adjacent to the fault location and there is no need to exchange fault recovery message between nodes involved. However, the length of the recovery route is significantly long. If a working path spans across one half of its ring, the length of the recovery route would become one and half times the whole length of the ring.

A two fiber ring network is described in a technical paper "An Optical FDM-Based Self-Healing Ring Network Employing Arrayed Waveguide Grating Filters and EDTA's with Level Equalizers", Hiromu Toba et al., IEEE Journal on Selected Areas in Communications, Vol. 14, No. 5, pages 800–813. In the two fiber ring network, one of the two rings is used as a working ring for transmission of signals in one direction of the ring topology and the other for transmission of the same signals in the opposite direction. A working path is established on the working ring between two nodes and a corresponding protection path is established between them on the protection ring. Under normal conditions, signals from the source node are forwarded onto the working path as well as onto the protection path. If the working path fails instant switching occurs at these two nodes to continue the communication over the protection path.

Although all signals can be fully and quickly recovered on the protection path, the constant use of the protection path, utilization efficiency of the transmission mediums is low.

SUMMARY OF THE INVENTION

It is therefore an object of the present invention to provide a ring topology network which requires short-length fault recovery routes and ensures high efficient utilization of transmission mediums.

According to a first aspect of the present invention, there is provided a communications network comprising a plurality of transmission links and a plurality of nodes for interconnecting the links to form a working ring and a protection ring in a ring topology, and establishing a plurality of working paths on the working ring and a plurality of protection paths on the protection ring corresponding to the plurality of working paths. In the network, one of the working paths spans across first and second nodes of the plurality of nodes for transmission of a signal in a first direction of the ring topology, and one of the protection paths spans across the first and second nodes for transmission of a signal in a second direction of the ring topology opposite to the first direction. The first and second nodes normally use the working path that spans across them. Responsive to a failure of the working path, the nodes use the protection path that spans across them, instead of the failed working path.

According to a second aspect, the present invention provides a communications network comprising a plurality of transmission links, and a plurality of nodes for interconnecting the links to form first and second working rings and first and second protection rings in a ring topology, and establishing a plurality of working paths on each of the working rings and a plurality of protection paths on each of the protection rings corresponding to the plurality of working paths. A first working path of the first working ring spans across first and second nodes for transmission of a signal in a first direction of the ring topology, and a second working path of the second working ring spans across the first and second nodes for transmission of a signal in a second direction of the ring topology opposite to the first direction. A first protection path on the first protection ring spans across the first and second nodes for transmission of a signal in the second direction of the ring topology, and a second protection path of the second protection ring spans across the first and second nodes for transmission of a signal in the first direction of the ring topology. The first and second nodes normally use the first and second working paths, respectively. Responsive to a failure of one of the first and second working paths, the first and second nodes use a corresponding one of the first and second protection paths, instead of the failed working path.

According to a third aspect, the present invention provides a communications network comprising a plurality of transmission links; and a plurality of nodes for interconnecting the links to form a working ring and a protection ring in a ring topology, and establishing a plurality of working paths on the working ring and a plurality of extra traffic paths on the protection ring. One of the working paths spans across first and second nodes for transmission of a signal in a first direction of the ring topology and one of the extra traffic paths spans across the first and second nodes for transmission of a low-priority signal in a second direction of the ring topology opposite to the first direction. The first and second nodes normally use the working path that spans across them. When a failure occurs in the working path, the extra traffic path between the nodes is cleared and a short-haul protection path is established for using it instead of the failed working path. If the short-haul protection path is not successfully established due to a further failure, other extra traffic paths are cleared and a long-haul protection path is established for using it instead of the failed working path.

According to a further aspect, the present invention provides a communications network in which first and second working paths are assigned a first network resource and first and second protection paths are assigned a second network resource. The first node normally uses the first network resource and the first working path for transmission of signals, and in response to a failure in the first ring, uses the second network resource and the second protection path, instead of the first network resource and the first working path. The second node normally uses the second network resource and the second working path for transmission of signals, and in response to a failure of the second ring, uses the first network resource and the first protection path, instead of the second network resource and the second working path.

According to a still further aspect, the present invention provides a communications network in which first and second working paths are assigned first and second network resources, respectively, and first and second protection paths are assigned the second and first network resources, respectively. The first node normally uses the first network resource and the first working path for transmission of signals and is responsive to a failure of the first ring to use the second protection path instead of the first working path. The second node normally uses the second network resource and the second working path for transmission of signals and is responsive to a failure of the second ring to use the first protection path instead of the second protection path.

According to a still further aspect, the present invention provides a network node for a ring topology network, the network having first and second working rings and first and second protection rings in a ring topology, and a plurality of working paths on each of the working rings and a plurality of protection paths on each of the protection rings corresponding to the plurality of working paths, the network node comprising a first demultiplexer for receiving a multiplex signal from one of the working paths for producing drop-off signals, a first multiplexer for multiplexing add-up signals onto the working path, a first path switch connected between the first demultiplexer and the first multiplexer, a second demultiplexer for receiving a multiplex signal from one of the protection paths for producing drop-off signals, a second multiplexer for multiplexing add-up signals onto the protection path, a second switch connected between the second demultiplexer and the second multiplexer, a transmit protection switch, a receive protection switch, and control circuitry for monitoring the working path and controlling the transmit protection switch so that one of the add-up signals is coupled to the first multiplexer when no failure is detected in the working path and coupled to the second multiplexer when a failure is detected in the working path, and controlling the receive protection switch so that one of the drop-off signals of the first multiplexer is received when no failure is detected in the working path and one of the drop-off signals of the second multiplexer is received when the failure is detected.

BRIEF DESCRIPTION OF THE DRAWINGS

The present invention will be described in further detail with reference to the accompanying drawings, in which.

DETAILED DESCRIPTION

Figure 1:
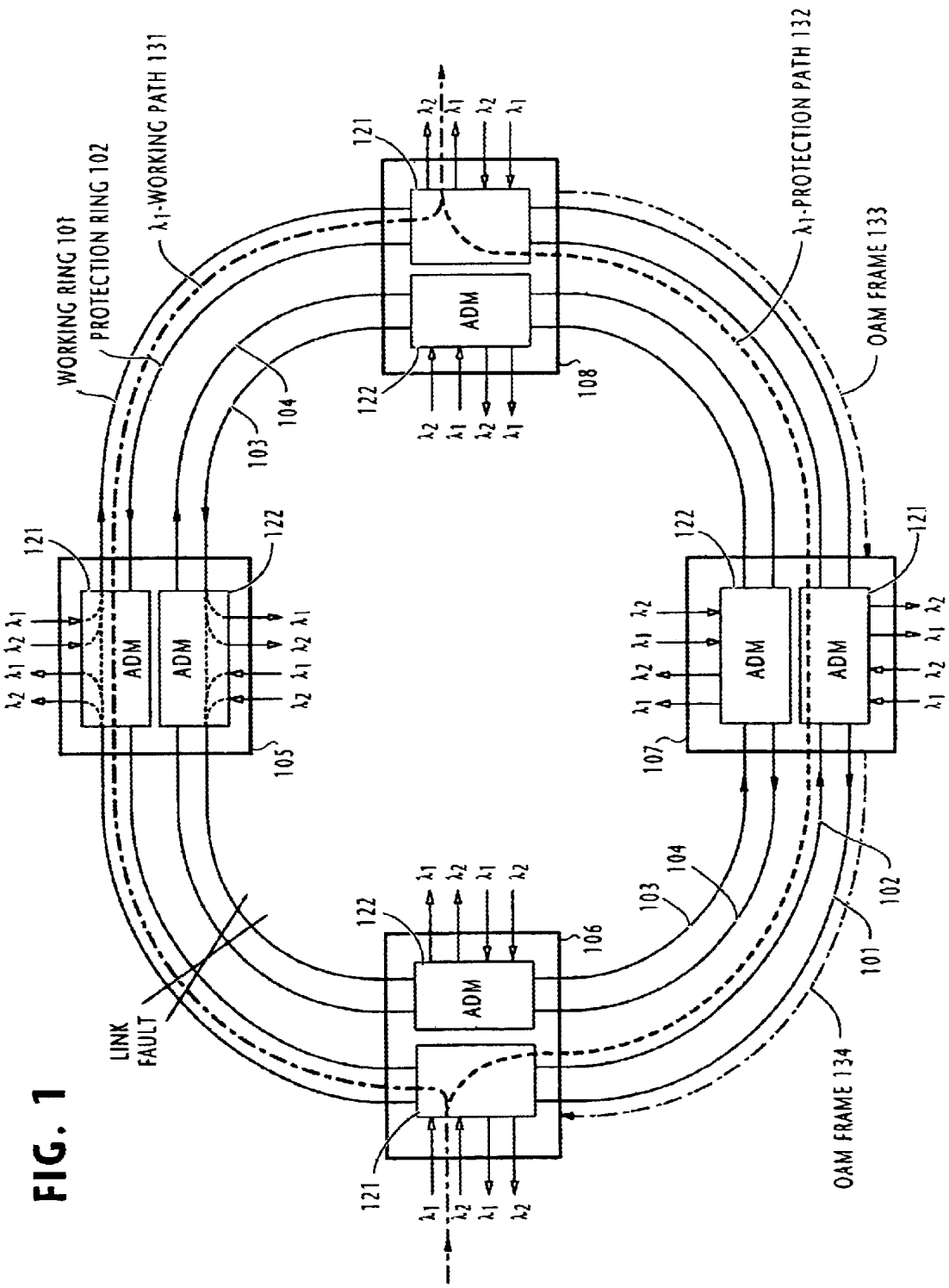
FIG. 1 is a block diagram of a ring topology optical network according to the present invention.

In FIG. 1, a wavelength-division multiplex (WDM) four-fiber ring network of the present invention is illustrated. The network is made up of a plurality of nodes 105 to 108 which interconnect optical fiber links to form rings 101 to 104 in a ring topology. Rings 101 and 102 form a first pair of working and protection transmission mediums, respectively, and the rings 103 and 104 form a second pair of working and protection transmission mediums, respectively. The directions of transmission of the working and protection rings of each pair are opposite to each other and the direction of transmission of the working ring of the first pair is opposite to that of the working ring of the second pair.

Each network node has a first add-drop optical multiplexer 121 for processing optical signals which normally propagate in the clockwise direction over the working ring 101 of the first pair and a second ADM 122 for processing optical signals which normally propagate in the counterclockwise direction over the working ring 103 of the second pair. In the event of a failure, the ADM 121 also processes signals propagating over the counterclockwise ring 102, while the ADM 122 processes signals propagating over the clockwise ring 104.

Each optical add-drop multiplexer of the network is connected to a network element such as ATM (asynchronous transfer mode) switches or SONET (Synchronous Optical Network) terminators to add up incoming traffic signals of wavelengths $\lambda_1$ and $\lambda_2$ in the 1.5 $\mu$m region by multiplexing them with other traffic signals and drop off traffic signals of $\lambda_1$ and $\lambda_2$ in the 1.5 $\mu$m region by demultiplexing them from other traffic signals. In addition to the traffic signals, a supervisory or OAM (operations, administration and maintenance) frame of wavelength $\lambda_B$ in the 1.3 µm region is multiplexed with the traffic signals.

Figure 2:
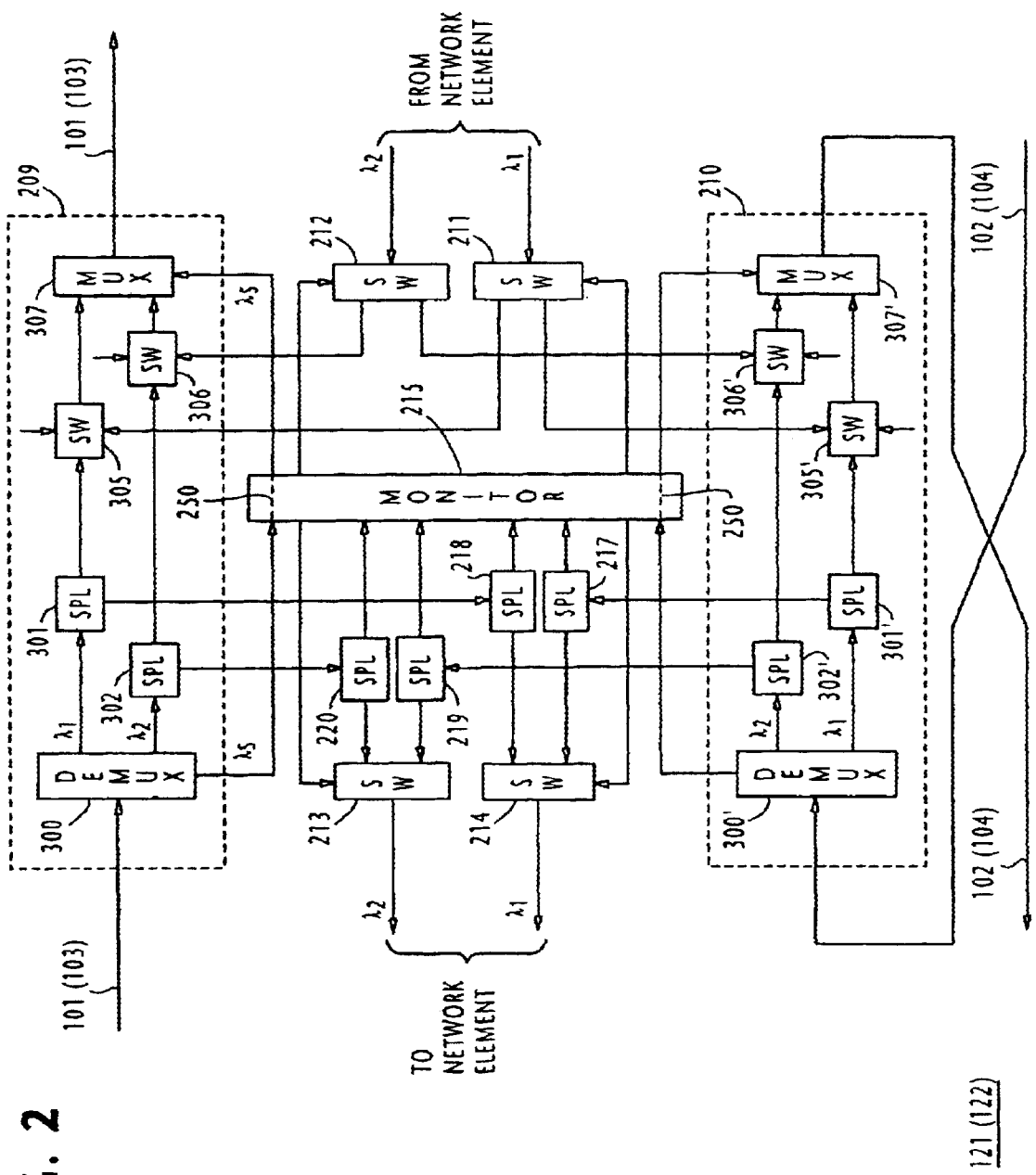
FIG. 2 is a block diagram of an optical add-drop multiplexer of FIG. 1.

All optical add-drop multiplexers 121 and 122 of the network are of identical construction. As shown in FIG. 2, each ADM 121 (122) includes a working ADM processor 209 and a protection ADM processor 210 of identical configuration, which are respectively connected in the working ring 101 (103) and the protection ring 102 (104). Because of the identical configuration, the description that follows is only concerned with the ADM 121 for simplicity.

At the input of ADM processor 209, a WDM signal arriving on the working ring 101 is supplied to an optical demultiplexer 300 where the traffic signal is separated into wavelength components $\lambda_1$ and $\lambda_2$ and fed to optical splitters 301 and 302, respectively, to drop off the received signals. Optical path switches 305 and 306 are provided to establish a junction point of an optical path or a source point of an optical path for add-up signals supplied from the network element via protection switches 211, 212. These path switches are controlled from an external source to exclusively supply an optical multiplexer 307 with signals from the splitters 301, 302 or signals from the protection switches 211 and 212.

In a similar manner, the counterclockwise WDM signal propagating over the protection ring 102 during a fault recovery period is supplied to an optical demultiplexer 300' of the ADM processor 210 where the traffic signal is separated into wavelength components $\lambda_1$ and $\lambda_2$ and fed to optical splitters 301' and 302', respectively. Optical path switches 305' and 306' are provided to establish a junction point of an optical path or a source point of an optical path for add-up signals supplied from the network element via protection switches 211, 212. These path switches are controlled from an external source to exclusively an optical multiplexer 307' with signals from splitters 301', 302' or signals from protection switches 211 and 212.

OAM command frames of the working ring are separated by the demultiplexer 300 and applied to a monitor circuit 215, where their contents are examined to control optical protection switches 211, 212, 213 and 214. OAM command are also transmitted on the protection ring 102 when it is used if the working route fails. OAM command frames on the protection ring 102 are detected by the demultiplexer 300' and applied to the monitor circuit 215 to control the optical protection switches 211, 212, 213 and 214 when the failed route is repaired. Monitor circuit 215 also relays the received OAM frame to downstream node as indicated by broken lines 250.

To the inputs of protection switches 213 and 214 are connected a plurality of splitters 217 to 220. Splitters 217 and 218 extract a greater portion (90%) of energy of the drop-off signals from splitters 301' and 301 for coupling to the protection switch 214 and supply the remainder energy to the monitor circuit 215. Likewise, splitters 219 and 220 extract a greater portion of energy of drop-off signals from splitters 302' and 302 for coupling to the protection switch 213 and supply the remainder energy to the monitor circuit 215. In response to control signals from the monitor circuit 215, the protection switch 213 selects one of the outputs of splitters 219 and 220 for application to the network element, and the protection switch 214 selects one of the outputs of splitters 218 and 219 for coupling to the network element.

Figure 3:
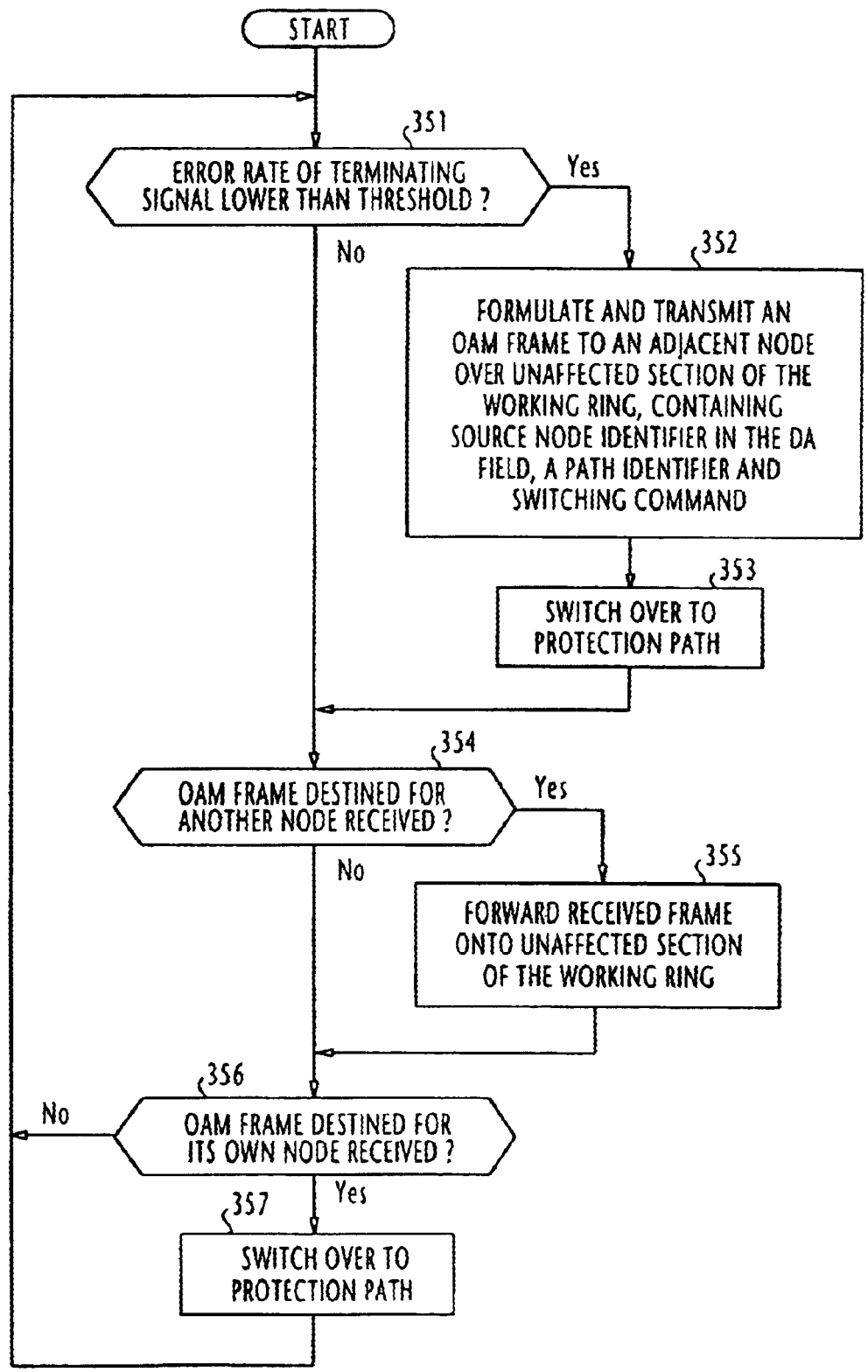
FIG. 3 is a flowchart of the operation of the monitor circuit of the add-drop multiplexer.

FIG. 3 is a flowchart of the operation of the monitor circuit 215 of each add-drop multiplexer during a fault recovery process.

A fault recovery process begins in a network node when the monitor circuit of the node determines that the bit error rate of an incoming optical signal that terminates to its own node has dropped below a predefined threshold value (step 351). If this is the case, the monitor circuit recognizes that its own node is a destination node of a working optical path from the source node of the monitored signal and a link failure has occurred in that working path. Flow proceeds to step 352 to formulate and transmit an OAM frame to an adjacent node over an unaffected section of the working ring, containing the source node identifier in the destination address (DA) field of the frame, the path identifier of the failed working path and the type of fault. At step 353, the monitor circuit of the destination node performs protection switching from the failed working path to a protection path pre-established between the source and destination nodes.

If the decision at step 351 is negative or if the monitor circuit of the destination node has performed protection switching at step 353, flow proceeds to step 354 to monitor OAM frames. If an OAM frame destined for another node is received, flow proceeds to step 355 to forward the frame onto an unaffected section of the working ring so that the frame is relayed to an adjacent node.

If the decision at step 354 is negative or the monitor circuit has relayed an OAM frame to an adjacent node, flow proceeds to step 356 to check to see if an OAM frame destined for its own node is received. If so, the monitor circuit of the source node recognizes that a link failure has occurred in a working path identified by the path identifier of the received frame and performs protection switching to the pre-established protection ring and returns to the starting point of the routine. If the decision at step 356 is negative, flow returns to step 351.

Therefore, if a link failure occurs between nodes 105 and 106 as shown in FIG. 1, the WDM signal normally propagating clockwise over an optical working path 131 from source node 106 to destination node 108 is affected and protection switching occurs at source and destination nodes 106 and 108 to switch over a protection optical path 132 to transport the affected signal in the counterclockwise direction.

More specifically, the working path 131 is established by ADMs 121 of nodes 106, 105 and 108 as follows.

At the source node 106, the switches 305, 306 set up connections between the protection switches 211, 212 and the multiplexer 307 so that source signals of wavelengths $\lambda_1$ and $\lambda_2$ from the network element are passed through the upper positions of protection switches 211, 212 and forwarded onto the working ring 101. At the intermediate node 105, the path switches 305, 306 set up connections between the splitters 301, 302 and the multiplexer 307 to forward the received signals onto the ring 101 in the clockwise direction. At the destination node 108, the protection switches 213, 214 are operated to select the outputs of splitters 220 and 218 for coupling the terminating signals received via splitters 301, 302 to the network element, while turning the path switches 305, 306 to cut off connections between the splitters 301, 302 and the multiplexer 307.

Optical protection path 132 is established by operating the path switches 305', 306' of intermediate node 107 to set up connections between the splitters 301', 302' and the multiplexer 307'. At the source node 106, the path switches 305' and 306' set up connections between the protection switches 211, 212 and the multiplexer 307' in preparation for possible transmission of the source signals to the protection ring 102 when these protection switches are switched to the lower position.

At the destination node 108, the path switches 305', 306' are turned off to prevent signals from being applied from these switches to the multiplexer 307' in preparation for possible reception of the terminating signals from the protection ring 102 via the demultiplexer 300' when the protection switches 213 and 214 are switched to their lower position.

The operation of the flowchart of FIG. 3 will be described below by assuming that a link failure occurs between nodes 105 and 106 on the working path 131 as indicated in FIG. 1.

First, the monitor circuit 215 of the destination node 108 detects the occurrence of the link failure when it determines that the bit error rate of the signals from splitters 218, 220 has dropped below the threshold value (step 351). Monitor circuit 215 of the destination node 108 formulates an OAM frame 133, containing the identifier of source node 106 and the identifier of the failed path 131 and a protection switching command. This frame is transmitted over an unaffected section of working ring 101 to node 107 (step 352), where the monitor circuit 215 of its ADM 121 examines the destination node identifier. Recognizing that the frame is not destined for the node 107 (step 354), it retransmits this frame to the source node 106 as an OAM frame 134 over an unaffected section of working ring 101 (step 355).

Meanwhile, the monitor circuit 215 of the destination node 108 operates the protection switch 214 to connect the output of splitter 217 to the network element (step 353) so that it can receive the WDM signal which will be transmitted on the protection path 132 from the source node 106.

When the monitor circuit 215 of source node 106 receives the OAM frame 134 (step 356), it recognizes that the frame is destined for its own node and a link fault has occurred and provides switching to a protection path by operating its protection switches 211, 212 (step 357). As a result the signals from the source node 106 are coupled through the protection switches 211, 212 and path switches 305', 306' and multiplexed by the multiplexer 307' into a WDM signal and forwarded onto the protection path 132 and transmitted in the counterclockwise direction to the intermediate node 107 and relayed to the destination node 108.

when the link failure is repaired, the network configuration is restored by switching from the protection ring to the working ring in preparation for a possible link failure.

If the link failure between nodes 105 and 106 is due to a cable cut, the WDM signal normally propagating counterclockwise on a working path established in the ring 103 is also affected. In this case, the nodes 108 and 106 acts as source and destination nodes to perform the routine of FIG. 3, with node 107 also acting as an intermediate node, to switch over the signal to a protection path pre-established in the ring 104.

It is seen that the length of protection path 132 for recovering a fault is significantly reduced in comparison with the prior art loopback four-fiber ring network. In a similar situation to that shown in FIG. 1, the loopback fault recovery scheme would require nodes 105 and 106 to form two loopback points, one on each end of the failed link, so that a recovery path is established starting from node 106, passing through nodes 107 and 108 to node 105, where it is looped back to the node 108. The present invention thus allows implementation of a four-fiber ring network having a long-haul ring structures with a small number of intermediate nodes.

It the network uses a frame format in which the bit position indicates information, the destination node identifier and the path identifiers may be respectively assigned first and second eight bits of the section overhead and the command may be represented by one bit. In the above-mentioned example case, only one working optical path is affected by a link failure for the purpose of described the basic operation of each node during a fault recovery process. If a number of optical paths are effected simultaneously, it is advantageous for a source node to formulate an OAM frame by concatenating such bit sequences in number corresponding to the number of affected paths, or wavelengths. Using a single command message, protection switching can be performed simultaneously on as many optical paths as these are different wavelengths in a fiber link.

Figure 4:
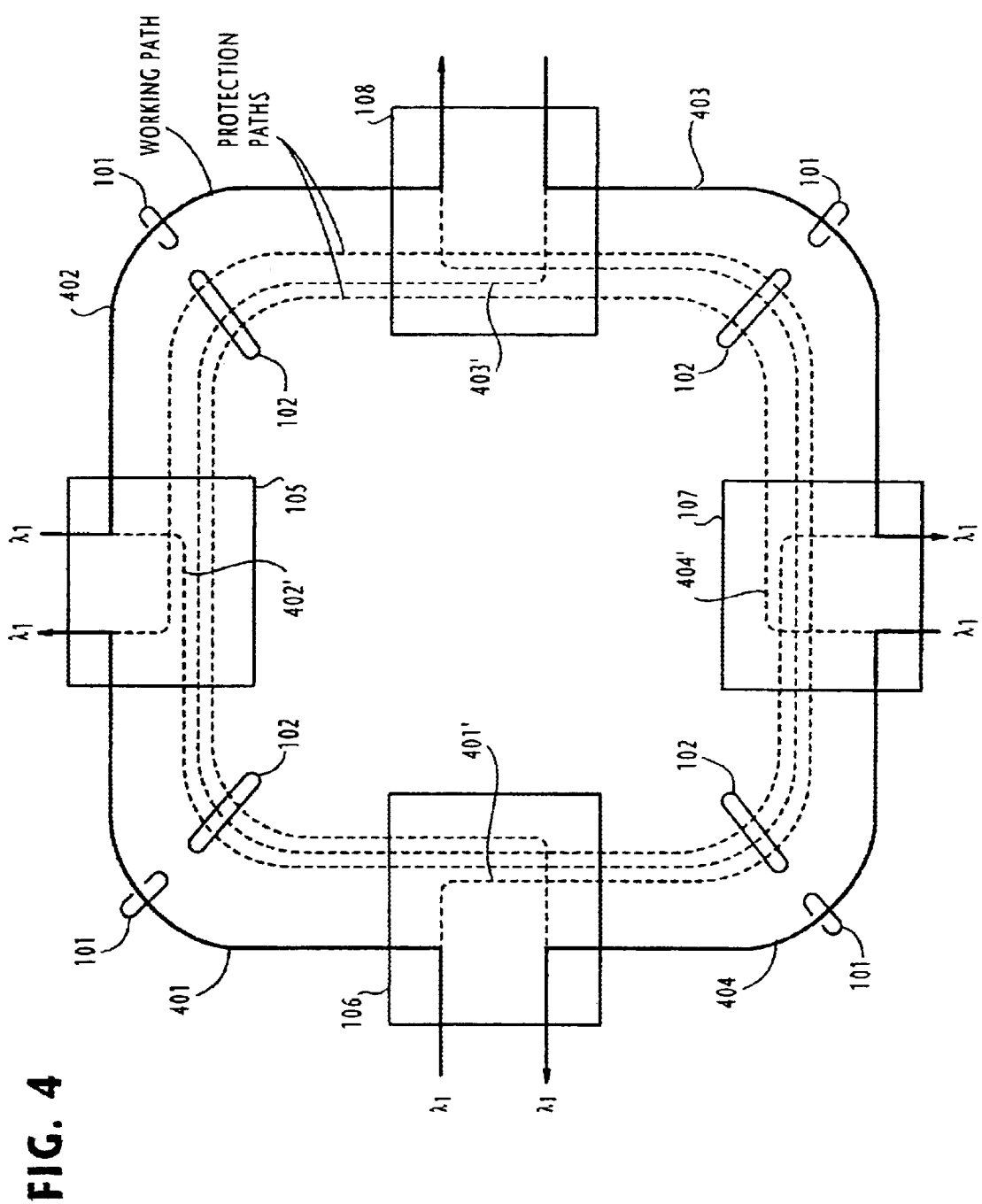
FIG. 4 is a schematic diagram illustrating multiple optical paths established in one of the working rings and in one of the protection rings of FIG. 1.

FIG. 4 shows an example of path configuration of the present invention in which a number of optical paths are established in the working ring 101 using a single wavelength. Since the network is of the symmetrical structure with respect to the direction of transmission, the path configuration of the second pair of rings 103 and 104 is identical to that of the first pair, only one pair of rings 101 and 102 is illustrated.

As illustrated, optical paths 401 to 404 are established in the clockwise working ring 101 using wavelength $\lambda_1$. Since it is possible to use other wavelengths to establish additional optical paths in the network, only one wavelength is shown to describe the advantage of the present invention.

Optical paths 401 to 404 are established on the working ring 101 between adjacent nodes in the clockwise direction of transmission. Corresponding to the working optical paths 401 to 404, protection optical paths 401' to 404' are respectively established in the counterclockwise ring 102 in such configuration that they support their counterparts in the event of a link failure. Specifically, protection path 401' extends counterclockwise from node 106 to node 105 via nodes 107 and 108, path 402' extending from node 105 to node 108 via nodes 105 and 107, path 403' extending from node 108 to 107 via nodes 105 and 106, and path 404' extending from node 107 to 106 via nodes 108 and 105.

Establishment of more than two optical paths on a single wavelength resource results in an optical ring topology network of high utilization efficiency as compared with the conventional two-fiber ring network where only one optical path is allowed for both working and protection rings and the wavelength resource of the protection ring is exclusively used by the working ring. In the present invention, the wavelength resource of the protection ring is not exclusively used by the working ring. Rather, it is shared by the optical paths in the working ring.

Another important feature of the present invention is that, since the distance travelled by the OAM frame is not greater than the length of the ring, and since intermediate nodes are not involved in protection switching, the amount of time taken to complete a fault recovery process is comparable to that of the conventional SONET four-ring topology network.

In contrast with the conventional two-fiber ring network where the protection ring is always used for transporting signals in a direction opposite to that of the signals on the working ring, the present invention provides a further advantage in that the normally unused protection ring can be used for transporting low priority signals.

In addition, difficulty exists in the prior art WDM ring-to-topology network to perform OAM management functions on wavelengths using a bundle of optical paths as a management unit. Such wavelength management can be easily achieved by using the present invention in a SONET environment since a bundle of paths can be used.

The coat of the ring-topology network of the present invention can be reduced by multiplexing additional wavelengths $\lambda_3$ and $\lambda_4$ on the working and protection rings 101 and 102, instead of using rings 103 and 104.

Figure 5:
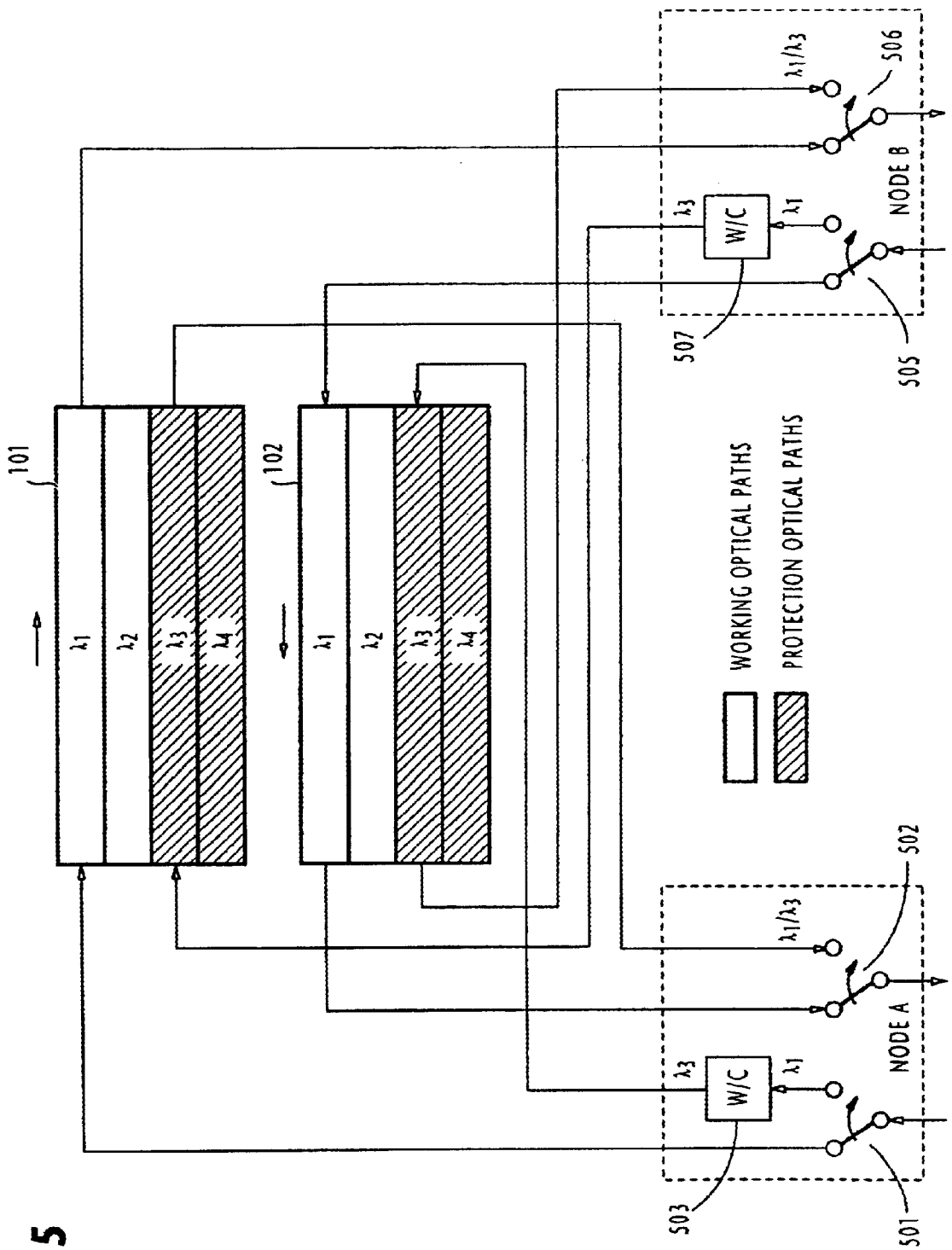
FIG. 5 is a schematic diagram of a two-ring topology network according to a modified embodiment of the present invention.

One embodiment of this two-fiber ring network is shown schematically in FIG. 5. Each of the working and protection rings 101 and 102 is identically assigned four wavelengths $\lambda_1$ to $\lambda_4$. In each ring, wavelengths $\lambda_1$ and $\lambda_2$ are used to establish working paths and wavelengths $\lambda_3$ and $\lambda_4$ are used to establish protection paths. The working paths in the ring 101 are used to carry optical signals in the clockwise direction and those in the ring 102 are used to carry optical signals in the counterclockwise direction. Thus, if the two-ring topology network has two nodes A and B as illustrated in FIG. 5, two working paths and two protection paths can be established between nodes A and B in each of the rings 101 and 102. If wavelength $\lambda_1$ is used for communication between nodes A and B, they use rings 101 and 102 respectively for their normal transmission.

Node A is provided with protection switches 501 and 502 and a wavelength converter 503, and node B is likewise provided with protection switches 505 and 506 and a wavelength converter 507. During normal operation, all switches are positioned to the left for transmission and reception of wavelength $\lambda_1$, so that the transmit signal from the switch 501 of node A is sent through ring 101 and received by switch 506 at node B and the transmit signal from the switch 505 of node B is sent through ring 102 and received by switch 502 at node A.

If node B detects the occurrence of a failure on the ring 101 by examining its terminating signal from ring 101, it sends a command message at wavelength $\lambda_s$ on the ring 102 to node A and moves its switch 506 to the right. In response, the node A moves its switch 501 to the right. Assume that wavelength $\lambda_3$ is assigned to both nodes for their transmission of signals during fault recovery time. The transmit signal of node A is now coupled through the switch 501 to the wavelength converter 503 where its wavelength is converted from $\lambda_1$ to $\lambda_3$. The $\lambda_3$-transmit signal is then applied to the protection path established on wavelength $\lambda_3$ in the ring 102 and transmitted in the counterclockwise direction. At node B, the wavelength of this signal is received through the switch 506. Since the transmit signal of the node B is unaffected, both nodes maintain their switches 502 and 505 in the left position. Thus, the transmit signals of both nodes propagate in the same counterclockwise direction over the ring 102 when the ring 101 fails. Although the wavelength $\lambda_B$ from ring 102 is different from that normally received through ring 101, the node B treats it as if it has the same wavelength as that normally used.

On the other hand, if the node A detects the occurrence of a failure on the ring 102 while it is using the ring 101 for normal transmission, it sends a command message on the ring 101 to node B and moves its switch 502 to the right. In response, the node B moves its switch 505 to the right. The transmit signal of node B is now coupled through the switch 505 to the wavelength converter 507 where its wavelength is converted from $\lambda_1$ to $\lambda_3$. The $\lambda_3$-transmit signal is then applied to the protection path established on wavelength $\lambda_3$ in the ring 101 and transmitted in the clockwise direction. At node A, the wavelength of this signal is received through the switch 502. Since the transmit signal of the node A is unaffected, both nodes maintain their switches 501 and 506 in the left position. Thus, the transmits signals of both nodes propagate in the same clockwise direction over the ring 101 when the ring 102 fails. Although the wavelength $\lambda_3$ from ring 101 is different from that normally received through ring 102, the node A treats it as if it has the same wavelength as that normally used.

Figure 6:
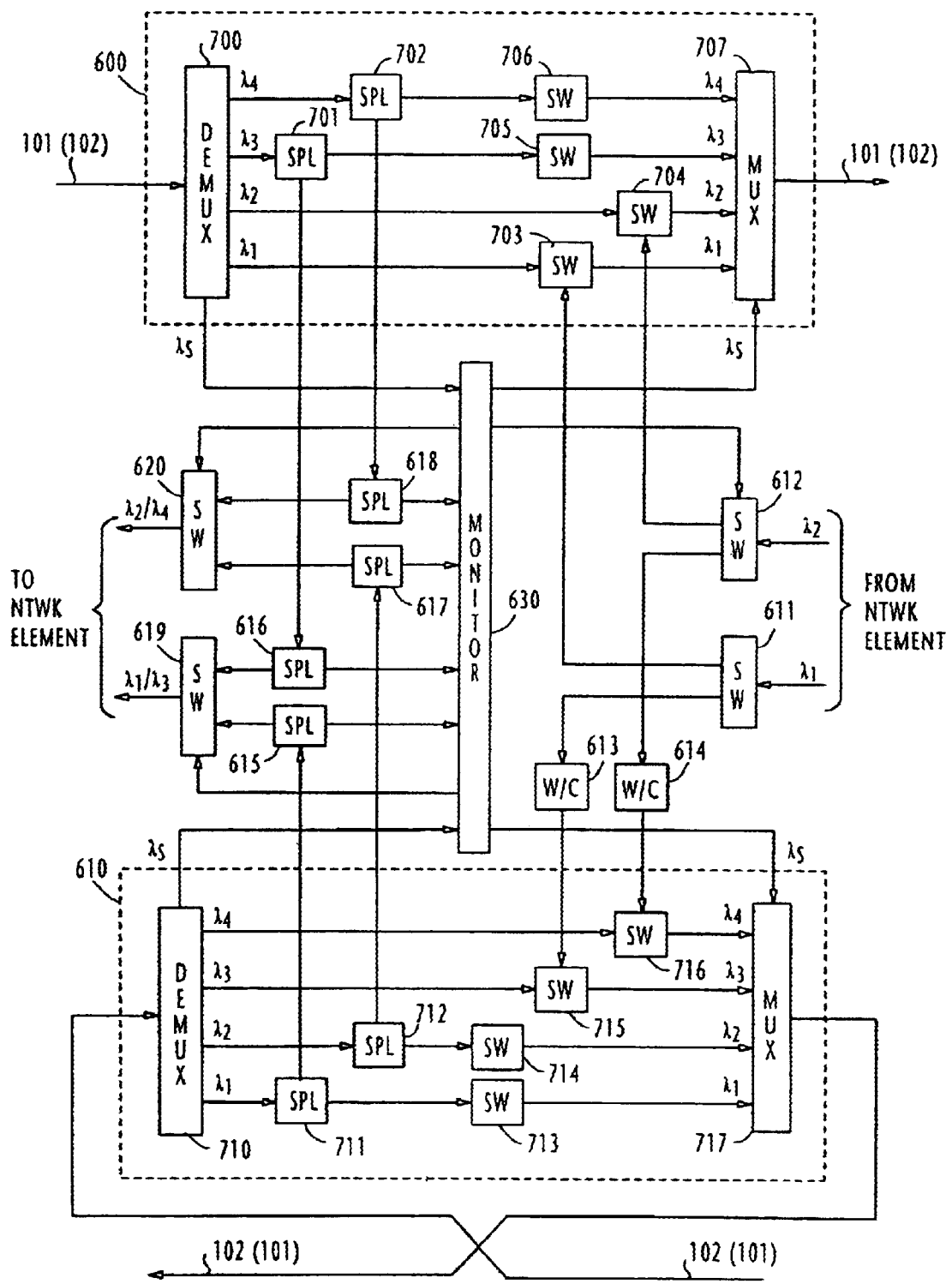
FIG. 6 is a block diagram of an add-drop multiplexer of FIG. 5.

FIG. 6 shows details of each node of FIG. 5. Each node is provided with add-drop multiplexes 600 and 610 which are respectively associated with rings 101 and 102.

In the ADM 600, WDM signal on the ring 101 (102) is separated by a demultiplexer 700 into four wavelength components. Wavelengths $\lambda_3$ and $\lambda_4$ are supplied through splitters 701 and 702 to path switches 705 and 706, whereas $\lambda_1$ and $\lambda_2$ are supplied direct to path switches 703 and 704. Multiplexer 707 combines the outputs of the path switches 703 to 706 onto the ring 101 (102). Wavelength $\lambda_3$ and $\lambda_4$ from splitters 701 and 702 are respectively supplied to protection switches 619 and 620 via splitters 616 and 618. On the other hand, WDM signal on the ring 102 (101) is separated by a demultiplexer 710 of ADM 610 into four wavelength components. Wavelengths $\lambda_1$ and $\lambda_2$ are supplied through splitters 711 and 712 to path switches 713 and 714, whereas $\lambda_3$ and $\lambda_4$ are supplied direct to path switches 715 and 716. Multiplexer 717 multiplexes output signals of the path switches 713 to 716 onto the ring 102 (101).

Via splitters 615 and 617, wavelength signals $\lambda_1$ and $\lambda_2$ from splitters 711 and 712 are respectively supplied to protection switches 619 and 620. Monitors circuit 630 receives replicas of the terminating signals from splitters 615 to 618 to assess their quality and controls the protection switches 619 and 620 to determine which one of the terminating signals from rings 101 and 102 is to be supplied to the network element.

Monitor circuit 630 further controls protection switches 611 and 612 for coupling the transmits signals $\lambda_1$ and $\lambda_2$ of the local node to one of the rings 101 and 102. When these protection switches are moved to the lower position, signals $\lambda_1$ and $\lambda_2$ are coupled to wavelength converters 613 and 614 and converted to $\lambda_3$ and $\lambda_4$, respectively. The outputs of wavelength converters 613, 614 are switched through the path switches 715 and 716 to the multiplexer 717 for transmission on ring 102 (101). When the protection switches 611, 612 are moved to the upper position, the signals $\lambda_1$ and $\lambda_2$ are coupled through the path switches 703 and 704 to the multiplexer 707 for transmission on ring 101 (102).

Figure 7:
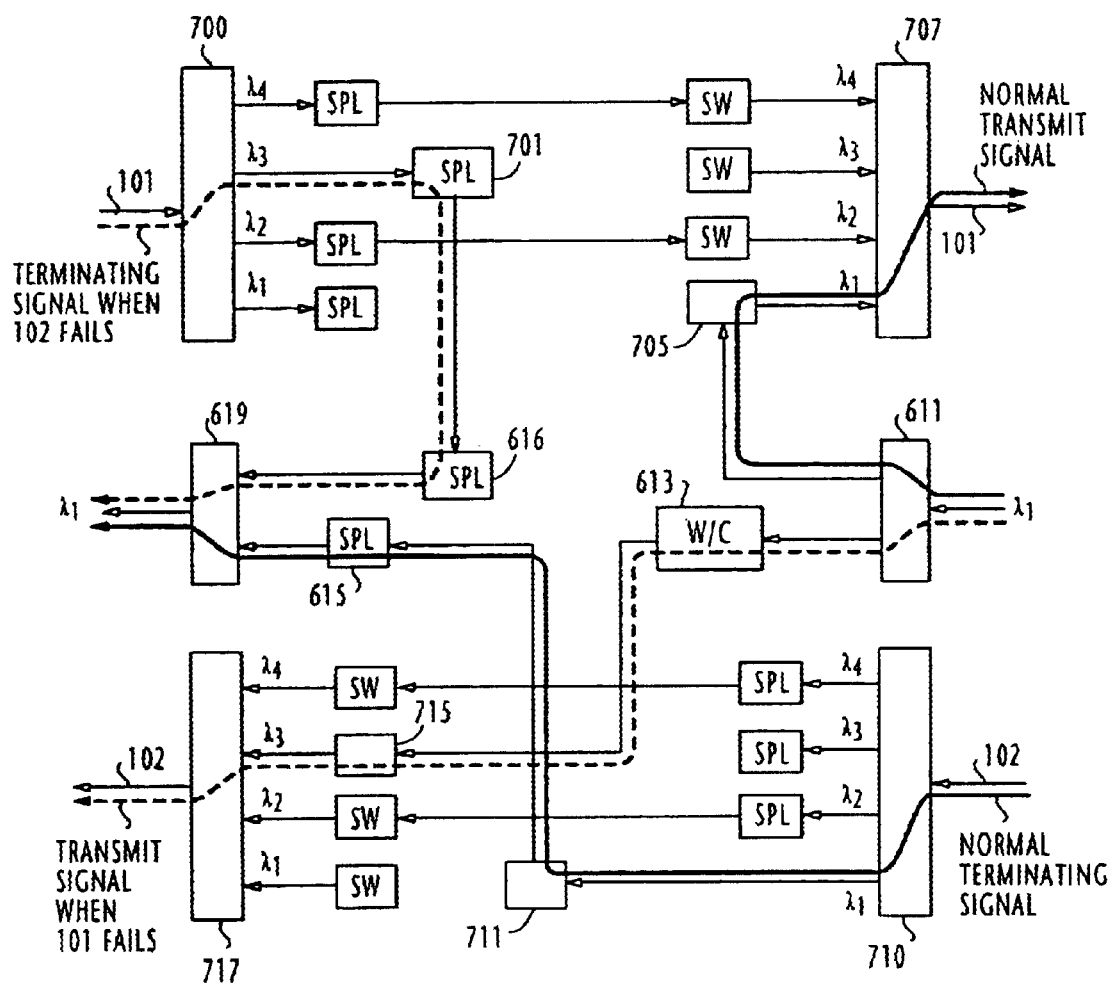
FIG. 7 is a schematic diagram showing routes followed by signals of FIG. 6 that occur in the event of link failures.

FIG. 7 schematically shows routes followed by signals of FIG. 6 in the case of node A of FIG. 5. During normal operation, transmit signal $\lambda_1$ is coupled through protection switch 611 and path switch 705 and forwarded onto ring 101. Terminating signal $\lambda_2$ from ring 102 is coupled through splitters 711 and 615 to protection switch 619 as indicated by a solid thick line.

When the ring 101 fails, the protection switch 611 is moved to the lower position, coupling the transmit signal to the wavelength converter 613. Thus, the wavelength of the signal is converted to $\lambda_9$ and transmitted through the path switch 75 to the ring 102 as indicated by a thick broken line. Thus, the communicating nodes transmit their signals on different wavelengths, using the same ring 102.

If the ring 102 fails, instead of ring 101, the protection switch 619 is moved to the upper position. Since the ring 102 is not the working ring of the local node, it is the remote node that switches its protection switch 611. Thus, at the local node, the terminating signal $\lambda_3$ arrives on ring 101 and is coupled through splitters 701 and 616 to protection switch 619 and thence to the network element as indicated by a thick broken line.

Figure 8:
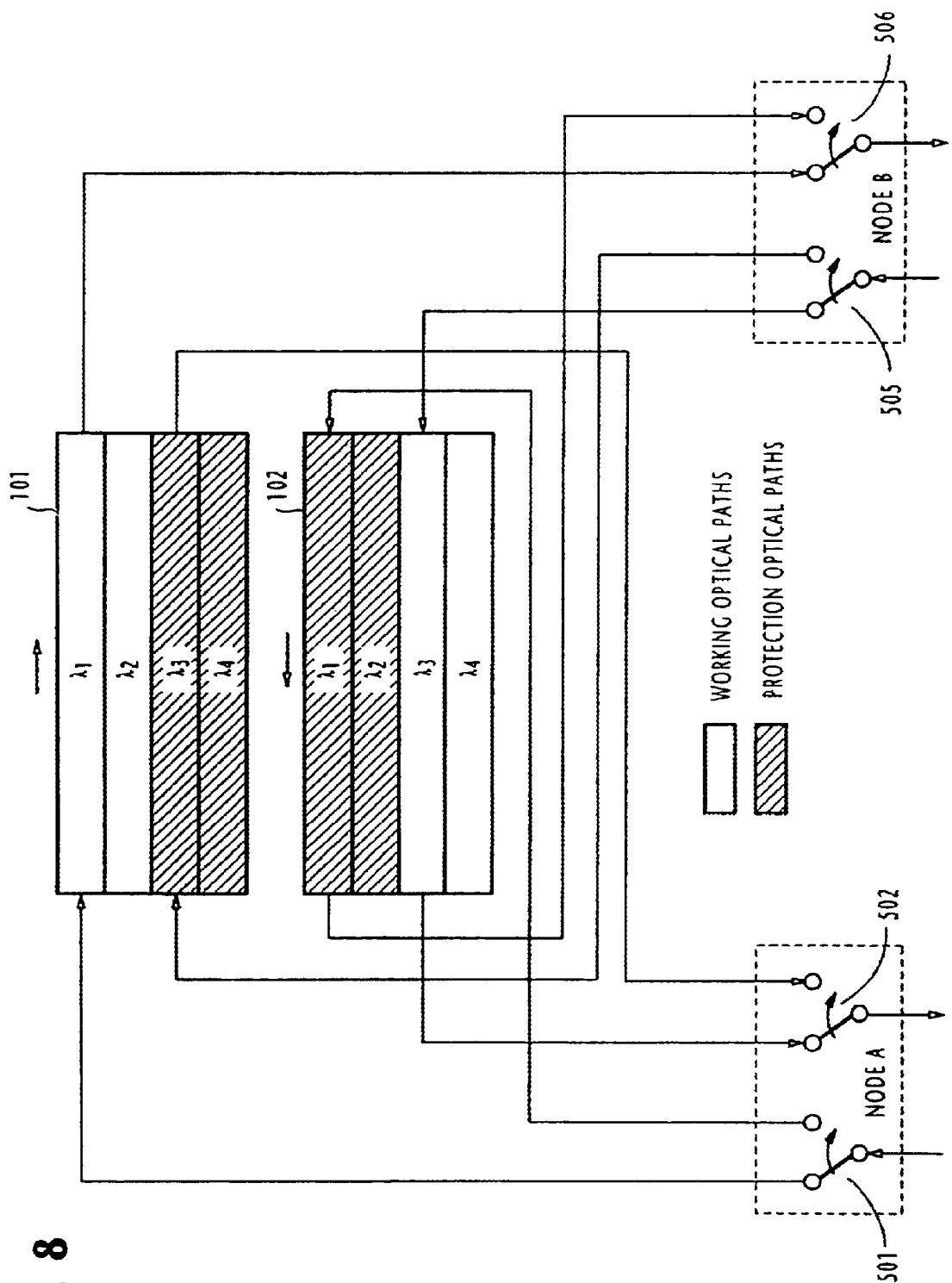
FIG. 8 is a schematic diagram of a two-ring topology network according to a further modification of the present invention.
Figure 9:
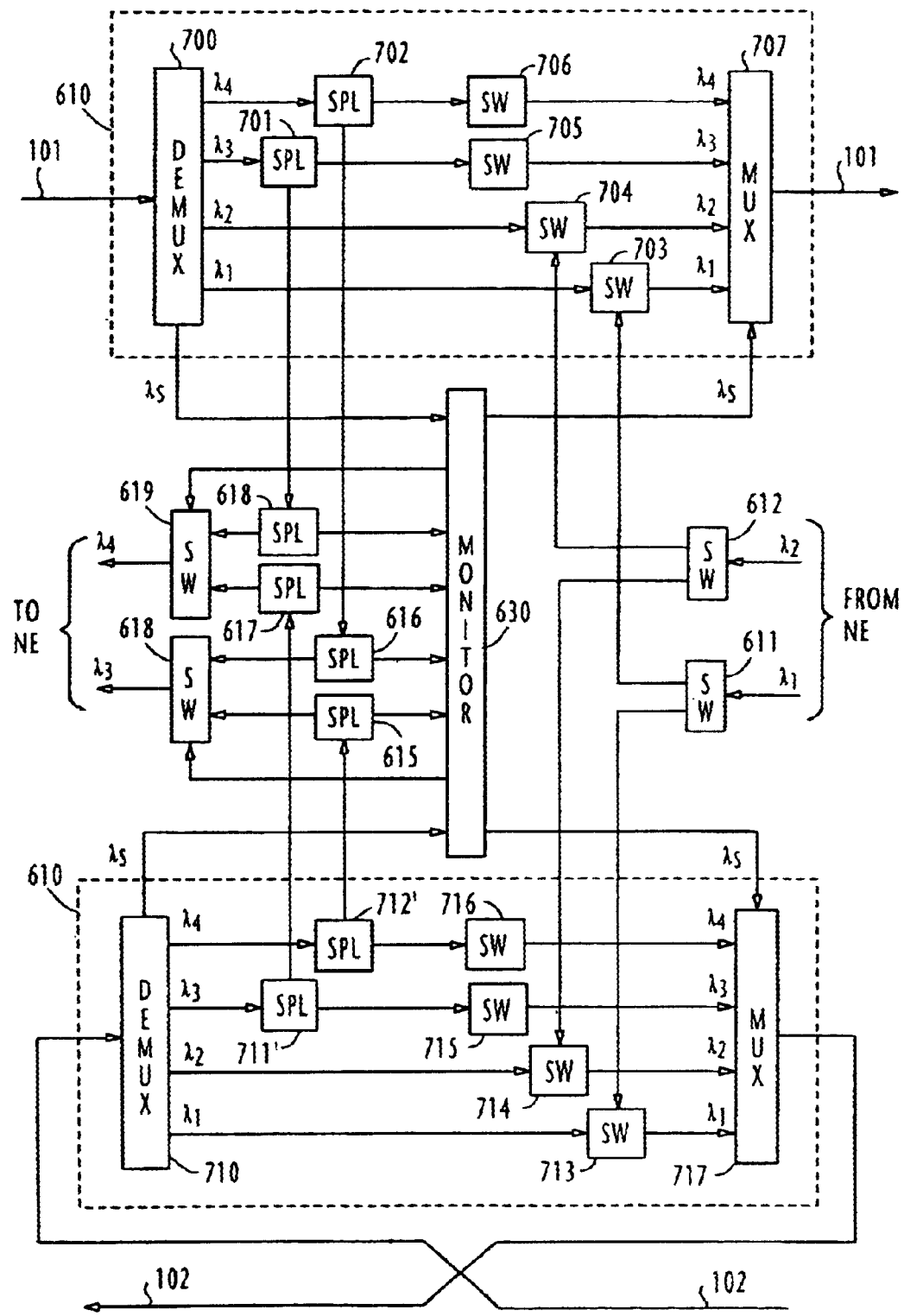
FIG. 9 is a block diagram of an add-drop multiplexer of FIG. 8.
Figure 10:
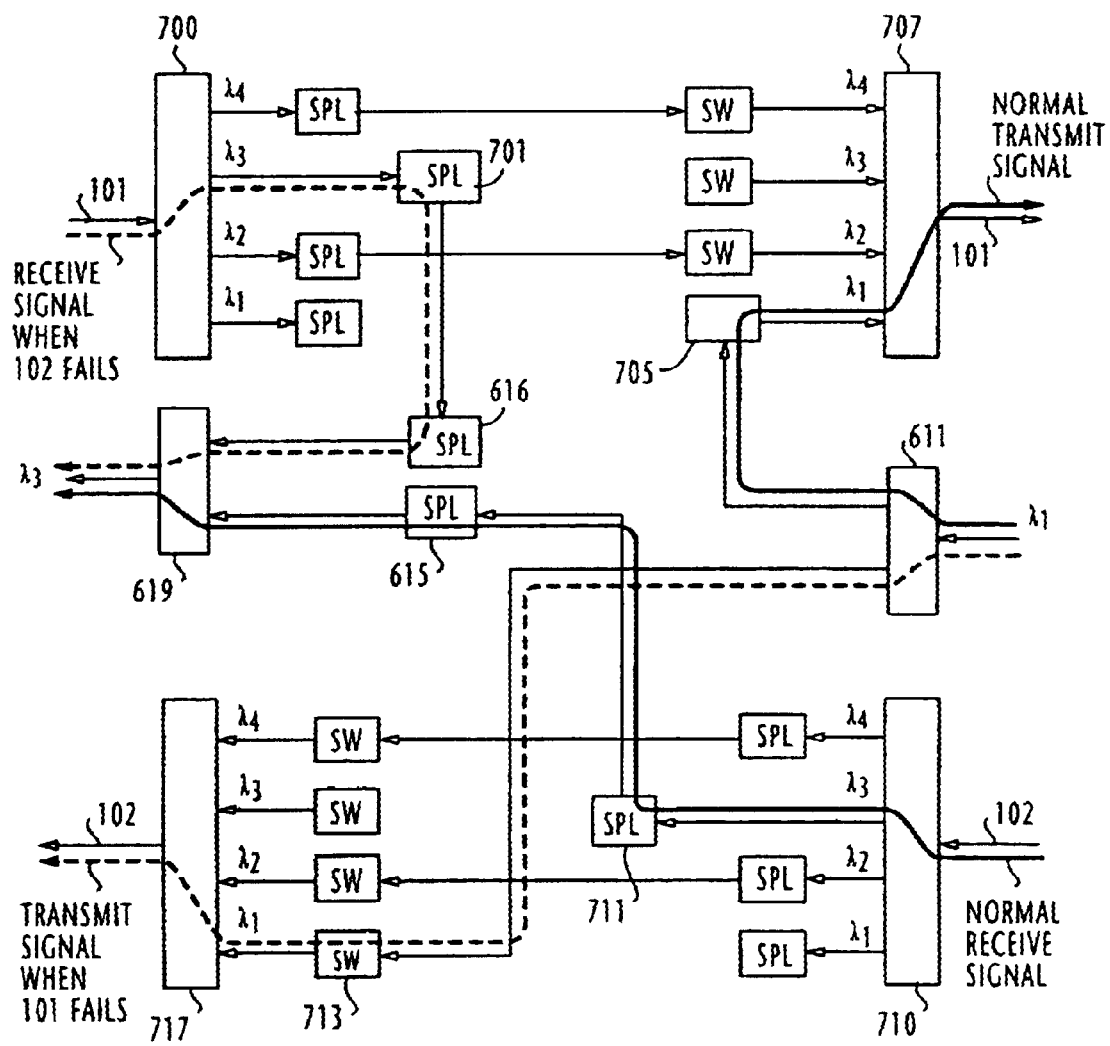
FIG. 10 is a schematic diagram showing routes followed by signals of FIG. 9 that in the event of link failures.

A modified form of the embodiment of FIGS. 5 to 7 is shown in FIGS. 8, 9 and 10, in which parts corresponding in significance to those in FIGS. 5 to 7 are marked with the same numerals as those in FIGS. 5 to 7.

As shown in FIG. 8, working optical paths are established with wavelengths $\lambda_1$, $\lambda_2$ on ring 101 and with wavelengths $\lambda_3$ and $\lambda_4$ on ring 102, instead of wavelengths $\lambda_1$ and $\lambda_2$. Protection optical paths are established using wavelengths $\lambda_3$ and $\lambda_4$ on ring 101 and using $\lambda_1$ and $\lambda_2$ on ring 102. This arrangement eliminates the need to use wavelength converters.

For communication between nodes A and B, wavelengths $\lambda_1$ and $\lambda_3$ as well as rings 101 and 102 are assigned respectively to nodes A and B. During normal operation, protection switches 501 and 502, at node A, are arranged to transmit wavelength $\lambda_1$ to ring 101 and receive terminating signal $\lambda_3$ from ring 102. At node B, protection switches 505 and 506 are arranged to transmit wavelength $\lambda_3$ to ring 102 and receive terminating signal $\lambda_1$ from ring 101. During fault recovery time, wavelengths $\lambda_1$ and $\lambda_3$ are also used by nodes A and B, respectively.

If node B detects the occurrence of a failure on the ring 101, it sends an OAM frame at wavelength $\lambda_3$ on ring 102 to the node A and moves its own switch 506 to the right. In response, the node A moves its switch 501 to the right for coupling the transmit signal $\lambda_1$ through switch 501 to the protection path established on wavelength $\lambda_1$ in the ring 102 and transmitted in the counterclockwise direction. This signal is received, at node B, through the switch 506. Since the transmit signal of node B is unaffected, both nodes maintain their switches 502 and 505 in the left position. Thus, the transmit signals of both nodes propagate in the same counterclockwise direction using different wavelengths over the ring 102 when the ring 101 fails.

If the node A detects the occurrence of a failure on the ring 102 while it is using the ring 101 for normal transmission, it send an OAM frame at wavelength $\lambda_1$ on the ring 101 to node B and moves its switch 502 to the right. In response, the node B moves its switch 505 to the right. The transmit signal $\lambda_3$, at node B, is now coupled through the switch 505 to the protection path established on wavelength $\lambda_3$ in the ring 101 and transmitted in the clockwise direction. At node A, this signal is received through the switch 502. Similar to FIG. 5, when the ring 102 fails, both nodes maintain their switches 501 and 506 in the left position and the transmit signals of both nodes propagate in the same clockwise direction over ring 101.

As illustrated in FIG. 9, each node of FIG. 8 is similar in configuration to that of FIG. 6 except that wavelength converters 613 and 614 are dispensed with and splitters 711' and 712' are connected to receive wavelength signals $\lambda_3$ and $\lambda_4$ from demultiplexer 710 for coupling to splitters 617 and 615.

Routes that are followed by the signals of FIG. 9 are schematically shown in FIG. 10 in the case of node A of FIG. 8. During normal operation transmit signal $\lambda_1$ is coupled through protection switch 611 and path switch 705 to ring 101. Terminating signal $\lambda_1$ from ring 102 is coupled through splitters 711 and 615 to protection switch 619 as indicated by a solid line.

When the ring 101 fails, the protection switch 611 is moved to the lower position, coupling the transmit signal through path switch 713 to the ring 102 as indicated by a thick broken line. Thus, the communicating nodes transmit their signals on wavelengths $\lambda_1$ and $\lambda_3$, using the same ring 102.

If the ring 102 fails, instead of ring 101, the protection switch 619 is moved to the upper position. Since the ring 102 is not the working ring of the local node A, it is the remote node that switches its protection switch 611. Thus, at the local node, the terminating signal $\lambda_3$ arrives on ring 101 and is coupled through splitters 701 and 616 to the network element is indicated by a thick broken line.

Figure 11A:
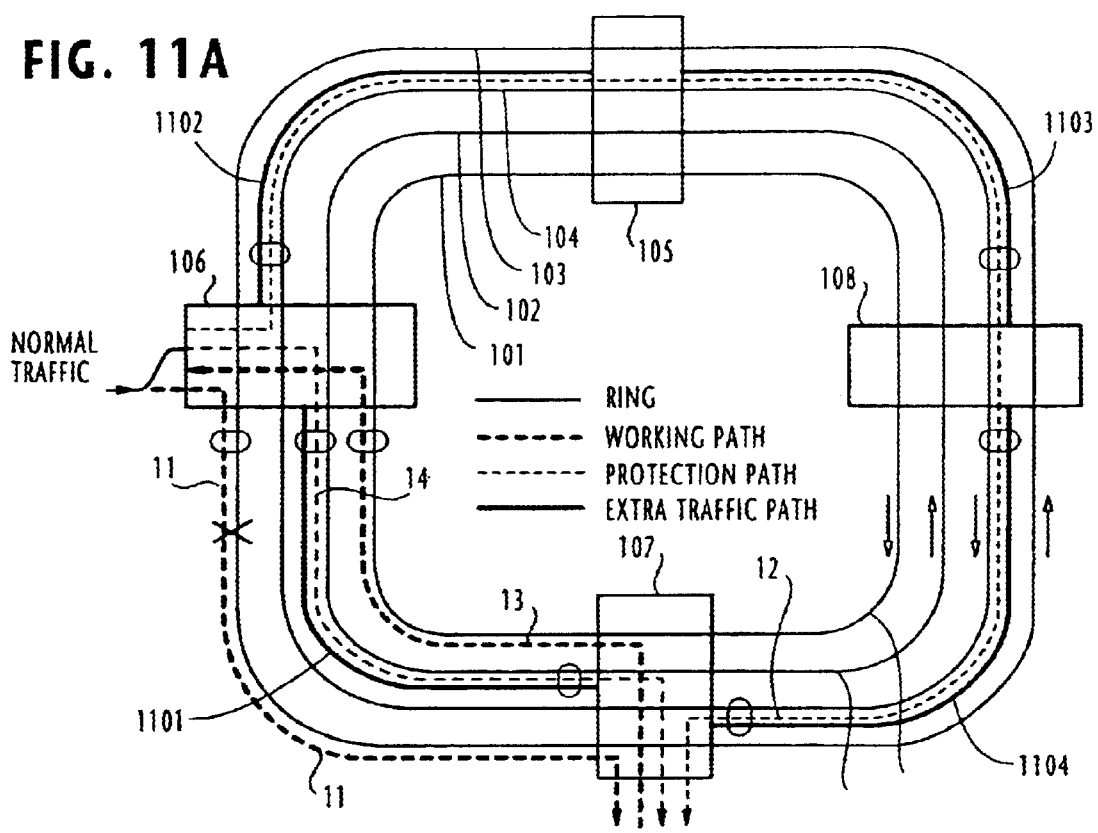
FIGS. 11A and 11B are schematic diagrams of a four-ring topology network according to a further embodiment of the present invention.

The following description is again concerned with a four-fiber ring network. In this network, low priority signals, or extra traffic are carried by protection rings 102 and 104. FIG. 11A shows one example such a four-ring topology network in which extra traffic is carried on an extra-traffic path 1101 on ring 102 between nodes 106 and 107 (shorter side of the ring) and on extra-traffic paths 1102, 1103 and 1104 on ring 104 between these nodes (longer side of the ring) as indicated by thick solid lines.

Since the extra-traffic paths must be cleared before a protection path is established for normal traffic, complexity of protection switching increases with the number of node-to-node hops and the number of extra-traffic paths.

In addition, the shorter side of the ring 102 between nodes 106 and 107 has a smaller number of extra-traffic paths than its longer side. Thus, it is advantageous to first clear the extra-traffic path on the shorter side of a ring when a working path 11 between nodes 106 and 107 fails. Extra-traffic paths on the long side of the ring 104 are cleared only if a failure also occurs on a protection path 14 or all links between nodes 106 and 107 as shown in FIG. 11B.

Figure 11B:
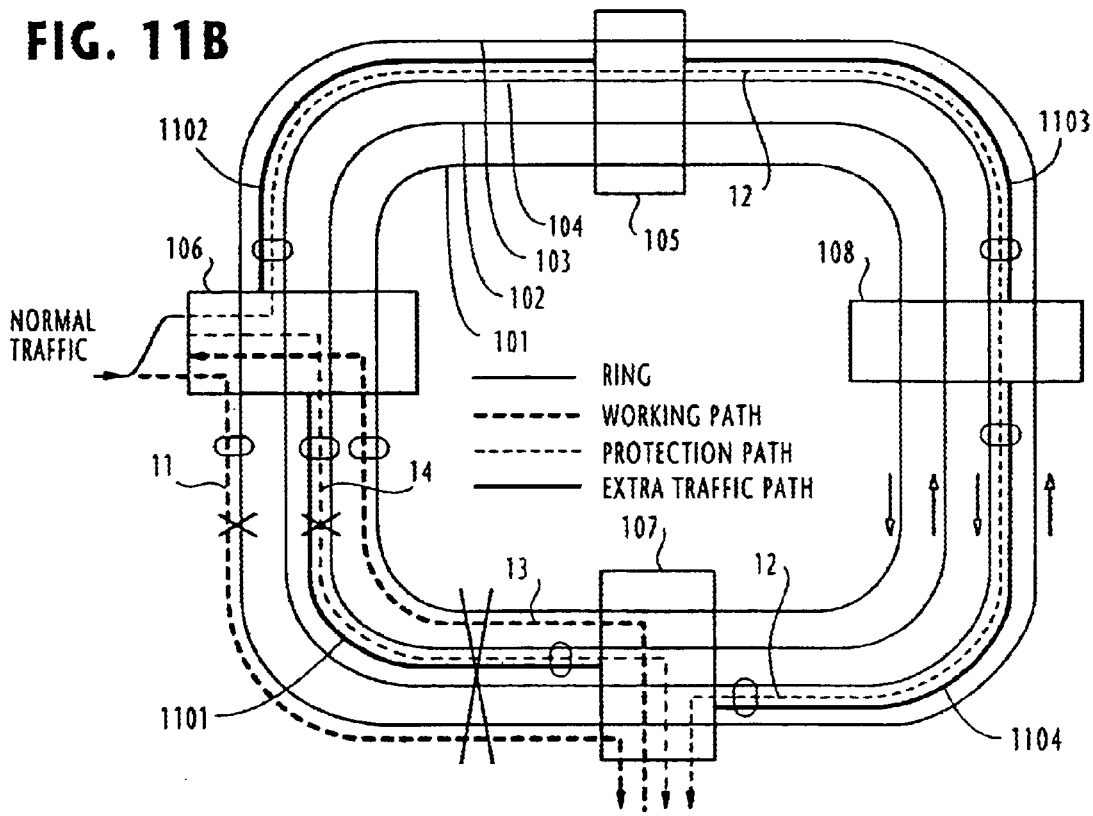
Figure 12:
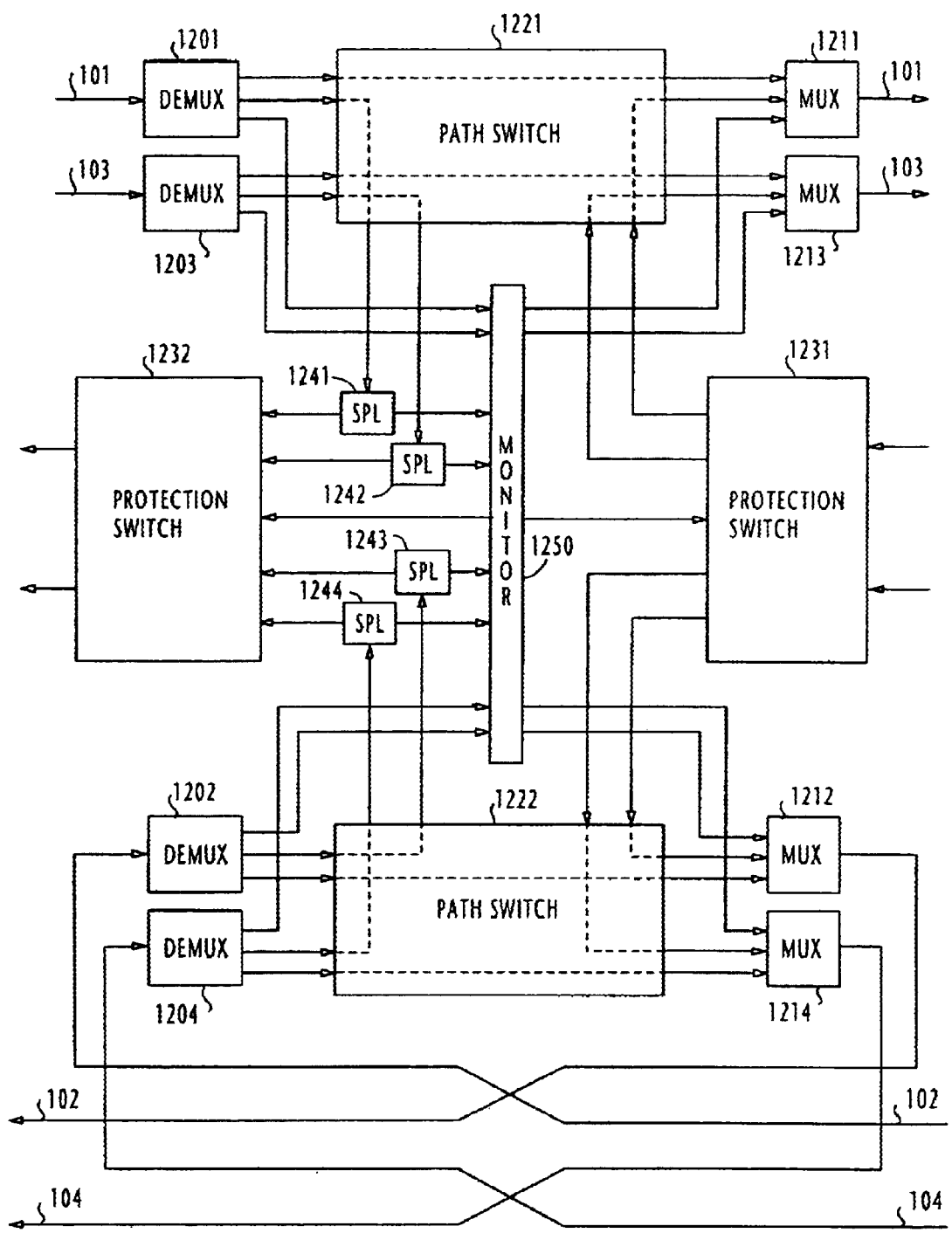
FIG. 12 is a block diagram of an add-drop multiplexer used in the embodiment of FIGS. 11A and 11B.

Details of each of the nodes of FIGS. 11A and 11B are shown in FIG. 12. To the working rings 101, 103 are connected optical demultiplexers 1201, 1203 and optical multiplexers 1211, 1213. An optical path switch 1221 is connected between these demultiplexers and the multiplexers. In a symmetrical relationship, a set of optical demultiplexers 1201, 1203 and multiplexers 1212, 1214 are associated with protection rings 102, 104, with an optical path switch 1222 being connected between these demultiplexers and multiplexers.

An outgoing optical protection switch 1231 is connected to the inputs of all multiplexers via the path switches 1221 and 1222 and an incoming optical protection switch 1232 is connected to the outputs of all demultiplexers via splitters 1241–1244 and the path switches.

Similar to the previous embodiment, the path switches are used to establish optical paths between nodes as well as to add up transmit WDM signals to and drop off terminating WDM signals from the transmission rings 101 to 104. Monitor circuit 1250 receives replicas of the terminating signals from the splitters as well as OAM frames from the demultiplexers to control the protection switches 1231 and 1232.

The operation of the monitor circuit 1250 of the nodes 107 and 106 will be described with the aid of the flowcharts of FIGS. 13A, 13B and 14. It is assumed that the node 107 is a destination node communicating with the source node 106 on the working path 11 and detects a path failure ceased by a link cut (see FIG. 11A) when the bit error rate of the terminating signal appearing at one of the outputs of demultiplexer 1201 falls below a threshold level. It is further assumed that an additional link failure occurs in a protection path 14 simultaneously with the failure of working path 11 (see FIG. 11B).

Figure 13A:
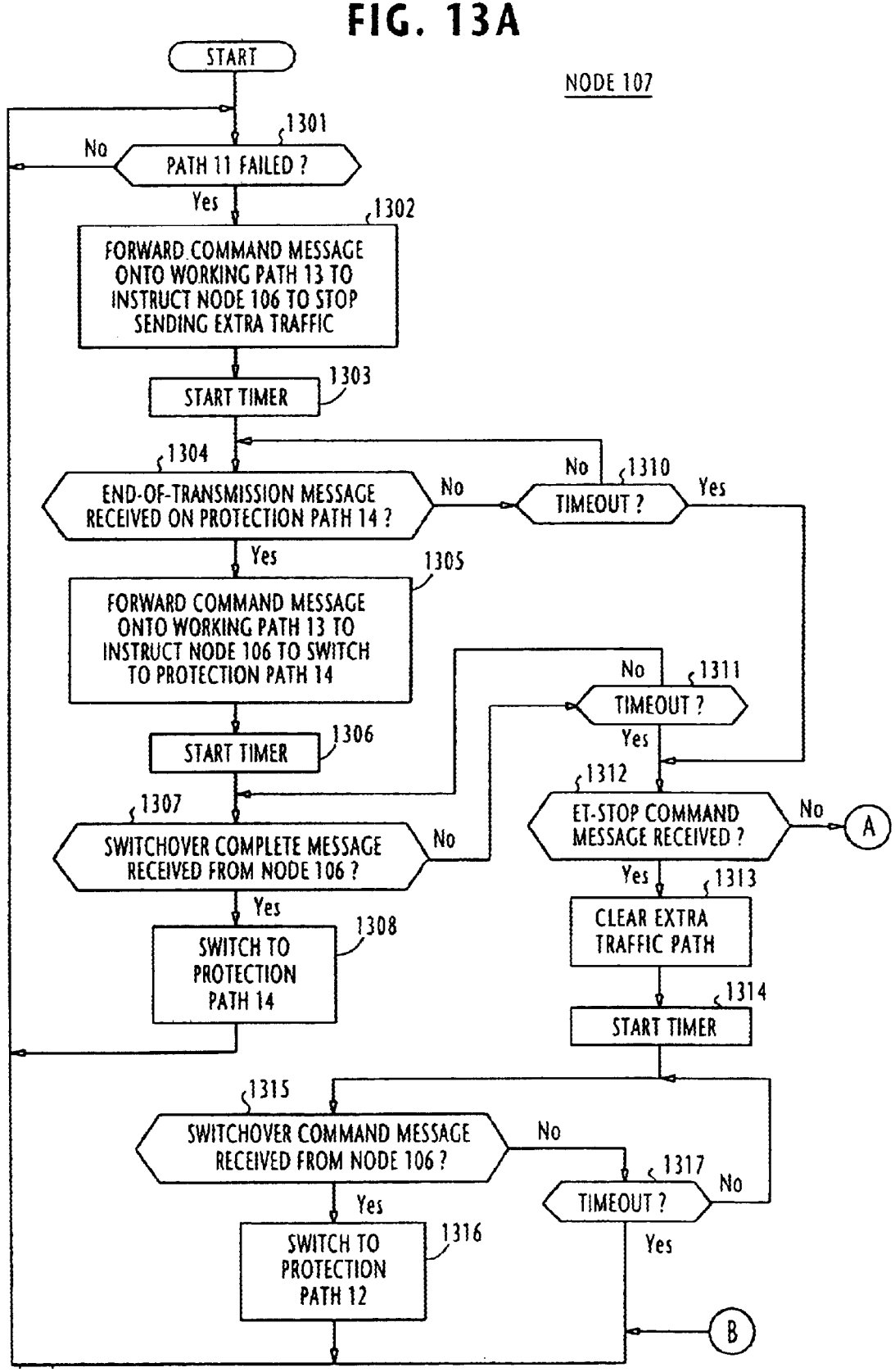
FIGS. 13A and 13B are flowcharts of the operation of the monitor circuit of a destination node of FIGS. 11A and 11B in the event of link failures.
Figure 13B:
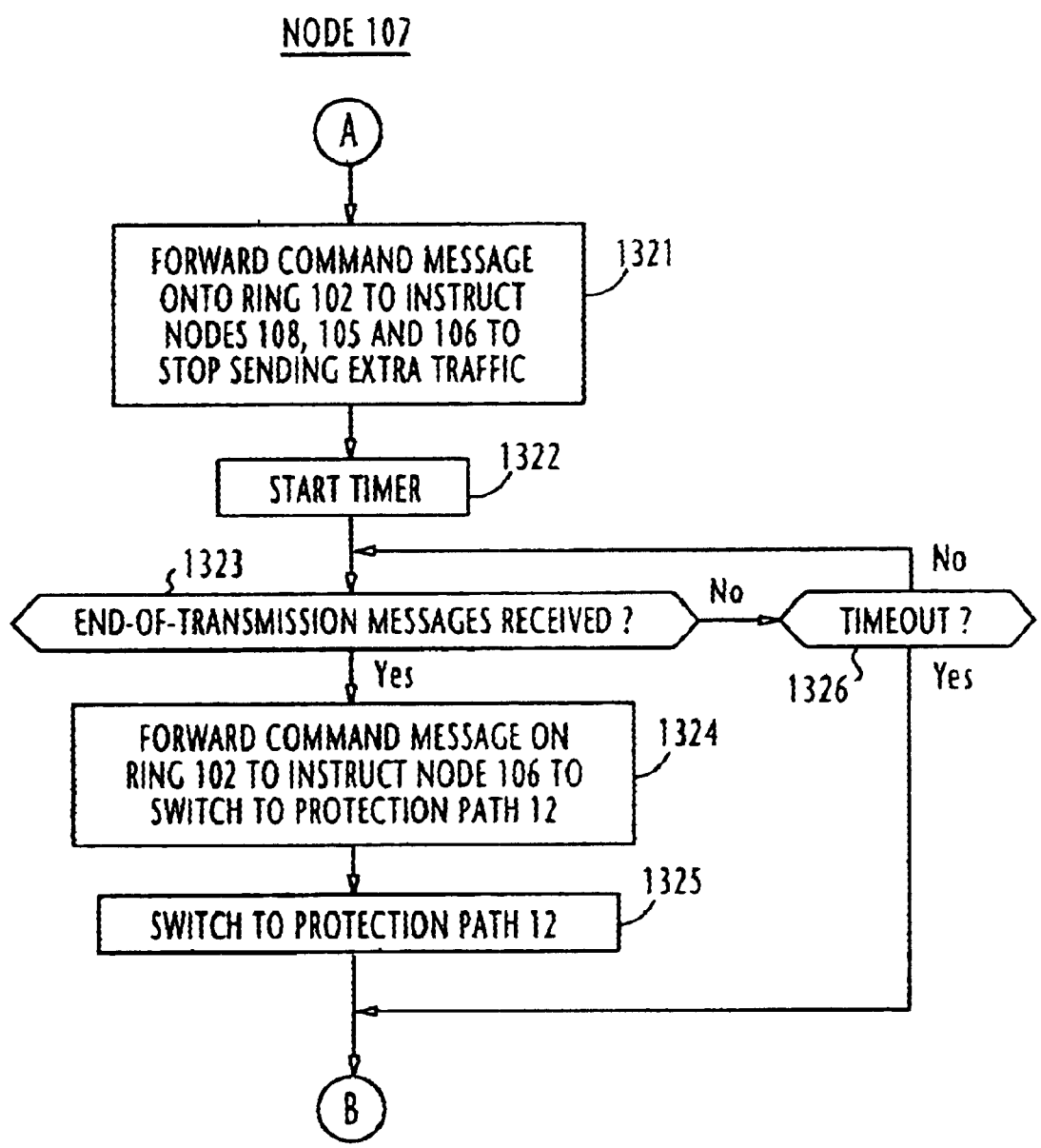

As shown in FIG. 13A, when the monitor circuit 1250 of node 107 detects a higher-than-threshold bit error rate, it exits step 1301 and enters step 1302 to formulate and transmit an ET-stop command message onto the working path 13 to instruct the node 106 to stop sending the extra traffic signal and to return an end-of-transmission message when it has cleared the ET path 1101 to establish a protection path 14.

Node 107 then begins a timing action (step 1303) and proceeds to decision step 1304 to check to see if an end-of-transmission message is received from the node 106. If this message is received, flow proceeds from step 1304 to step 1305 to forward a switchover command message on the working path 13 to instruct the node 106 to switch from the failed path 11 to the protection path 14. Node 107 starts a timing action at step 1306 and waits for a switchover complete message from the node 106 (step 1307). If this switchover complete message is received, flow proceeds from step 1307 to step 1308 to switch from the failed path 11 to the protection path 14, and returns to the starting point of the routine.

If an end-of-transmission message is not received from the node 106 within the period of the timing action started at step 1303, or if no switchover complete message is received from the node 106 within the period of the timing action started at step 1306, flow proceeds from step 1310 or 1311 or decision step 1312 to check to see if an ET stop command message is received from the node 106. If so, the node 107 clears the extra traffic path 1104 at step 1313, and starts a timing action at step 1314.

Node 107 proceeds from step 1314 to step 1315 to determine whether a switchover command message is received from the node 106 through the protection ring 102.

If all links between nodes 106 and 107 fail due to a cable cut, no ET stop command message will be received and the decision at step 1312 is negative. In this case, the node 107 proceeds to step 1321 (FIG. 13B) to forward ET-stop command messages onto the ring 102 to the nodes 108, 105 and 106 to stop sending their extra traffic signals and clear their extra-traffic paths 1102, 1103 and 1104 (see FIG. 11B).

A timing action is then started (step 1322) to wait for end-of-transmission messages from the nodes 108, 105 and 106 (step 1323). If all of these messages are received within the period of this timing action, flow proceeds from step 1323 to step 1324 to forward a switchover command message on the ring 102 to the node 106 to instruct it to switch from the failed path 11 to the protection path 12. Otherwise, flow exits step 1326 and returns to the starting point of the routine. At step 1325, the node 107 also switches from the failed path 11 to the protection path 12, and returns to the starting point of the routine.

Figure 14:
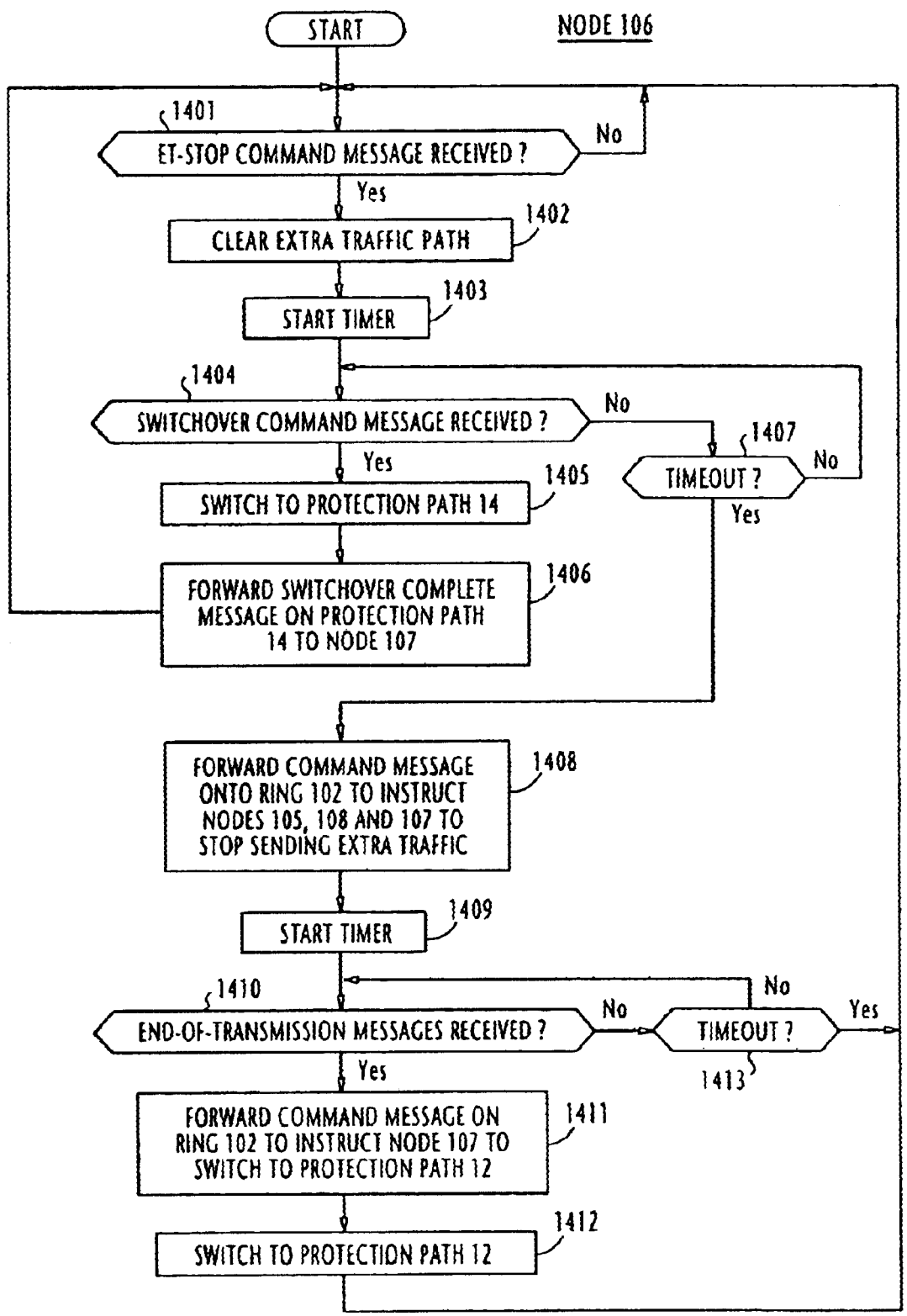
FIG. 14 is a flowchart of the operation of the monitor circuit of a source node of FIG. 11B in the event of link failures.

Referring to FIG. 14, when the source node 106 receives an extra-traffic stop command message from the node 107 at step 1401, it proceeds to step 1402 to clear the extra traffic path 1102. In addition, the node 109 also receives this message and clears the extra traffic path 1101. Protection path 14 is thus established.

At step 1403, the node 106 begins a timing action and proceeds to decision step 1404 to check to see if a switchover command message (see step 1305, FIG. 13) is received from the node 107. If so, it switches from the failed path 11 to the protection path 14 (step 1405) and sends a switchover complete message on the protection path 14 to the node 107 (step 1406), and returns to the starting point of the routine.

If the node 106 fails to receive the switchover command message within the period of the timing action started at step 1403, flow proceeds from step 1407 to step 1408 to forward ET-stop command messages onto the ring 102 to the nodes 105, 108 and 107 to stop sending their extra traffic signals and clear their extra-traffic paths 1102, 1103 and 1104 (see FIG. 11B).

A timing action is then started (step 1409) to wait for end-of-transmission messages from the nodes 105, 108 and 107 (step 1410). If all of these messages are received within the period of this timing action, flow proceeds from step 1410 to step 1411 to forward a switchover command message on the ring 102 to the node 107 to instruct it to switch from the failed path 11 to the protection path 12. Otherwise, flow exits step 1413 and returns to the starting point of the routine. At step 1412, the node 106 also switches from the failed path 11 to the protection path 12, and returns to the starting point of the routine.

Returning to FIG. 13, the node 107 receives this switchover command message of step 1411 from the node 106 within the period of the timing action started at step 1314, and proceeds to step 1316 to switch from the failed path 11 to the protection path 12, and returns to the starting point of the routine. If no switchover command message is received within the period of the timing action started at step 1314, the node 107 recognizes that no available path is present for recovering the faults, and returns to the starting point of the routine from step 1317.

It is seen therefore that in a four-ring topology network where a number of extra traffic paths are established on protection routes, the extra traffic paths on a short protection route are first cleared to establish a shot protection path. If this protection path is not established within a prescribed interval due to an additional failure, then the extra paths on a longer route are cleared to establish a longer protection path.

Figure 15A:
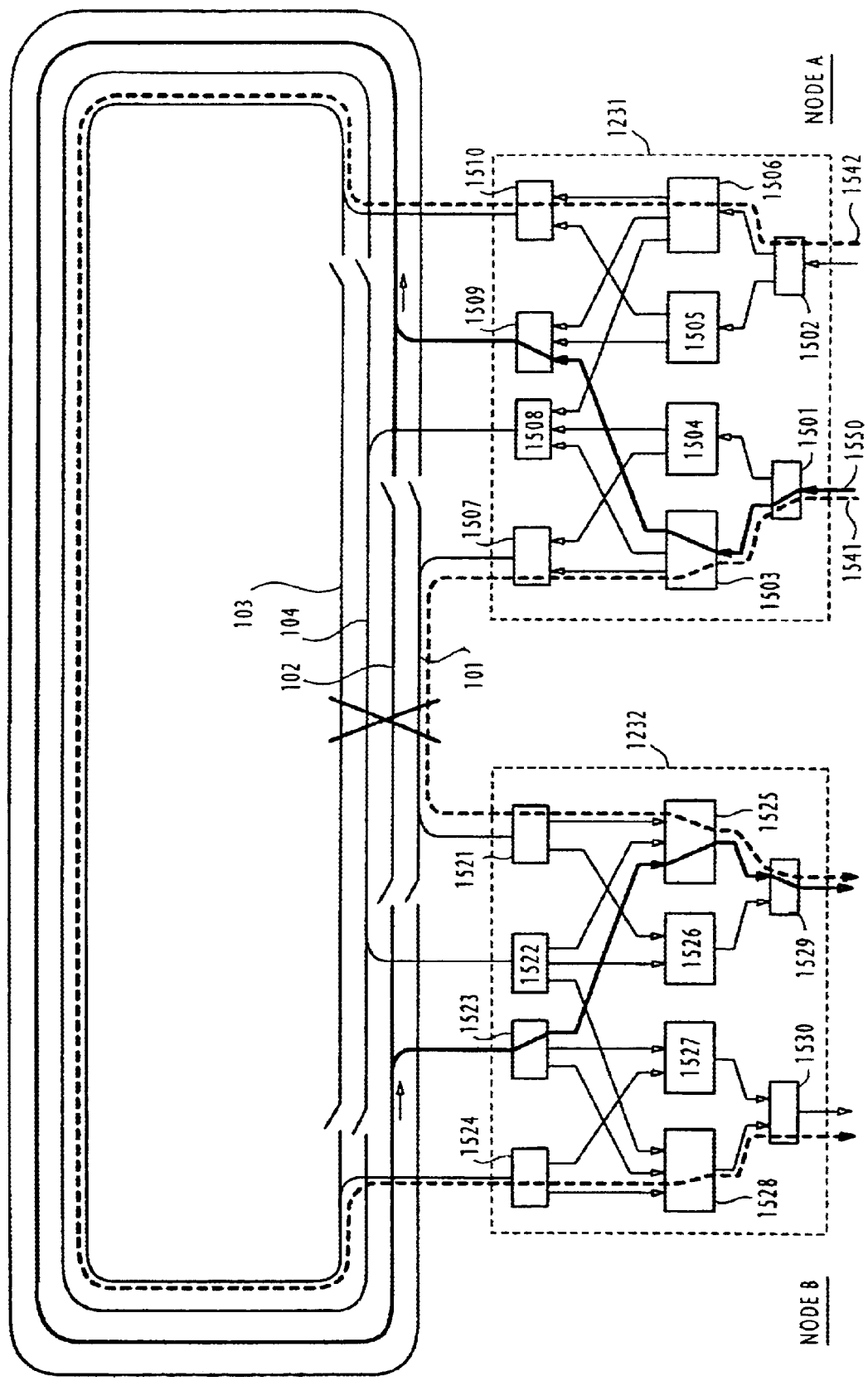
FIGS. 15A, 15B and 15C are block diagrams of optical protection switches useful for universal applications for possible failures in a four-ring topology network.

FIG. 15A shows details of the transmit protection switch 1231 and the receive protection switch 1232 of FIG. 12. Because of the bidirectional characteristic of photonic devices such as optical couplers and optical switches, it is advantageous for universal applications that each of these transmit and receive protection switches can be constructed of identical configuration for possible failures.

A multiport optical coupler, for example, can be used as an optical splitter because a light beam incident on one of its ports appears equally at the other ports. It can also be used as an optical combiner or multiplexer if two or more light beams are incident on a number of input ports, they are combined together and appears at an output port.

For simplicity, optical paths from node A to node B only are illustrated in a four-ring topology network, using two working rings 101 and 103 and two protection rings 102 and 104. It should be appreciated that the same four rings can also be used by optical paths from node B to node A. The transmit protection switch 1231 and the receive protection switch 1232 are located in the nodes A and B, respectively.

Within the node A, the optical protection switch 1231 includes a pair of optical couplers 1501 and 1502 which act as optical splitters on two transmit for dividing each signal into two routes. The outputs of splitter 1501 are connected to a 1×3 optical switch 1503 and a 1×2 optical switch 1504 and the outputs of splitter 152 are connected to a 1×3 optical switch 1504 and a 1×2 optical switch 1505. These optical switches are controlled by the monitor circuit 1250.

The outputs of optical switch 1503 lead to optical combiners 1507, 1508 and 1509, the outputs of optical switch 1504 leading to optical combiners 1507 and 1508. In a symmetrical configuration, the outputs of optical switch 1505 lead to optical combiners 1510, 1509 and 1508, protection paths are used by the outputs of optical switch 1505 leading to optical combiners 1510 and 1509. Optical combiners 1507 to 1510 are connected to rings 101, 104, 102 and 103, respectively.

Within the node B, the optical protection switch 1232 includes optical splitters 1521 to 1524 respectively connected to rings 101, 104, 102 and 103. Splitter 1521 has two outputs connected to a 3×1 optical switch 1525 and a 2×1 optical switch 1526. Splitter 1522 has three outputs connected to switches 1525, 1526 and a 3×1 optical switch 1528. The outputs of optical switches 1525 and 1526 are connected to a combiner 1529. In a symmetrical manner, splitter 1524 has two outputs connected to the switches 1528 and 1527, and the splitter 1523 has three outputs connected to the switches 1525, 1527 and 1528. The outputs of optical switches 1527 and 1528 are connected to a combiner 1530.

For normal communication, a first transmit signal from node A is forwarded onto working ring 101 via a switch 1503 and combiner 1507 and received at node B via splitter 1521 and switch 1525, as indicated by a thick broken line 1541. A second transmit signal is forwarded onto working ring 103 via switch 1506 and 1510 and received at node B via splitter 1524 and switch 1528, as indicated by a thick broken line 1542.

If a cable fault occurs and all rings that span between nodes A and B are cut off as indicated in FIG. 15A, the first transmit signal on route 1541 is affected while the second transmit signal remains unaffected. The monitor circuit at node B detects that the signal on route 1541 has failed and examines the supervisory OAM frames transmitted on wavelength $\lambda_s$ and knows that portions of all rings that span across nodes A and B have failed. At node B, the switch 1525 is moved to the leftmost position to receive the affected signal from protection ring 102 via splitter 1523. In addition, the node B instructs the node A to move its switch 1503 to the rightmost position to forward the first transmit signal onto the protection path 102 via combiner 1509. In this way, an alternate route is established as indicated by a thick line 1550.

Figure 15B:
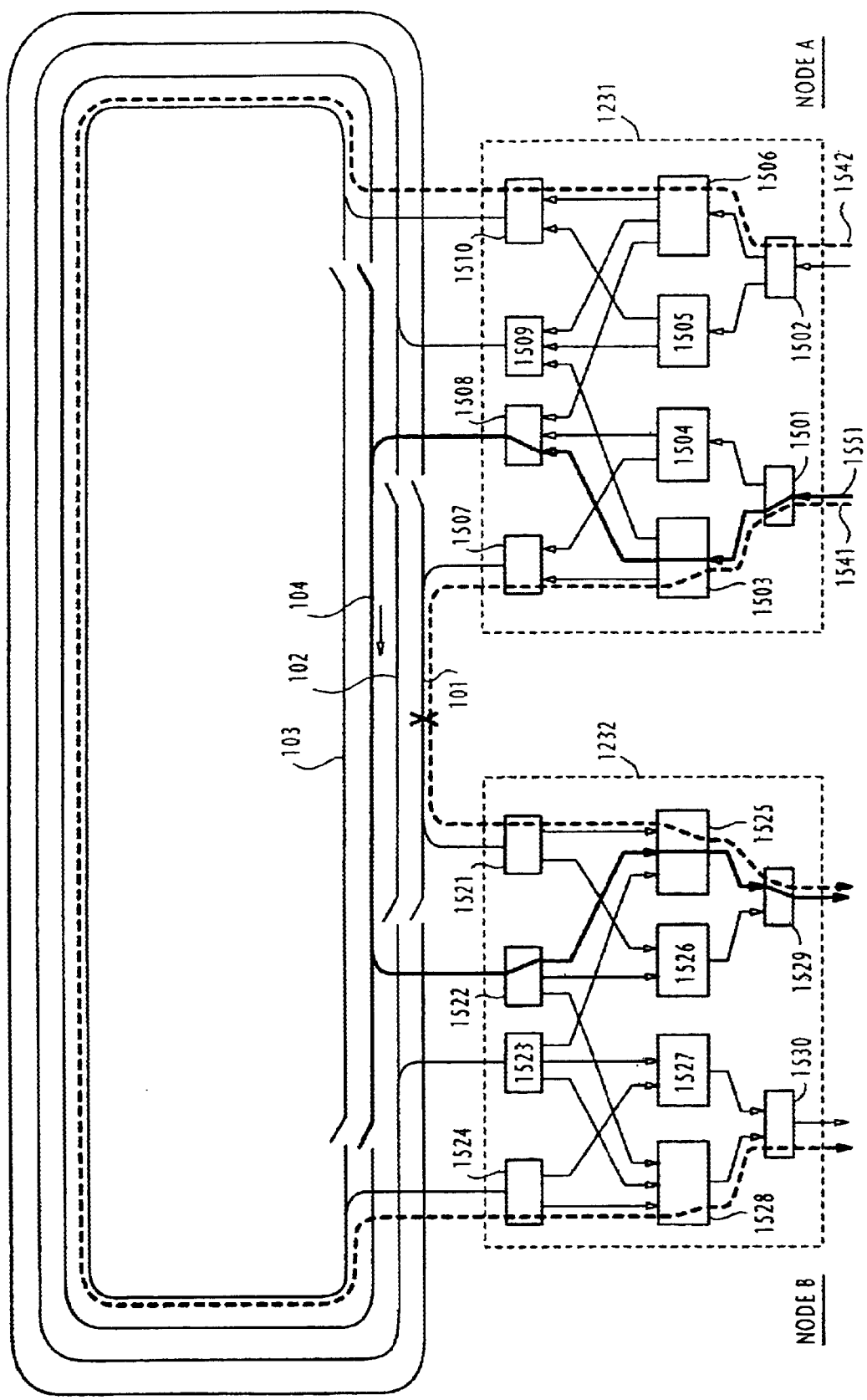

If a link failure occurs on the working ring 101, affecting only one working path as shown in FIG. 15B, the monitor circuit at node B detects that the signal on route 1541 has failed and examines the supervisory OAM frames and knows that the signal on route 1541 only has failed. Node B causes the switch 1525 to move to the center position to receive the affected signal from protection ring 104 via splitter 1522. In addition, the node B instructs the monitor circuit at node A to move its switch 1503 to the center position to forward the first transmit signal onto the protection path 104 via combiner 1508. In this way, an alternate route is established as indicated by a thick line 1551.

Figure 15C:
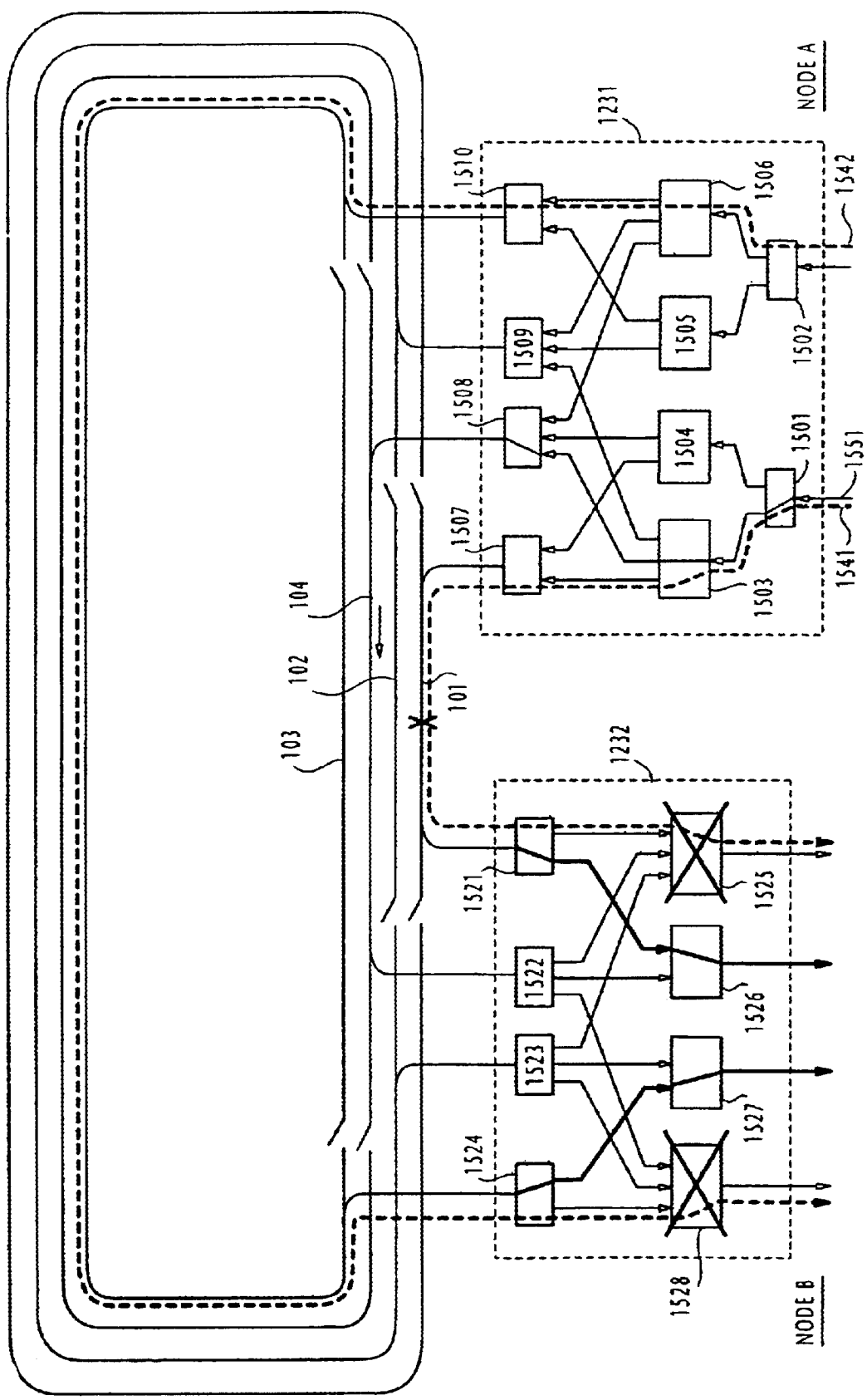

The optical protection switches can be modified as shown in FIG. 15C. In this modification, the splitters 1529 and 1530 of FIGS. 15A and 15B are not used. Instead, the outputs of optical switches 1525 to 1528 are directly used as inputs of a network element. Monitor circuit 1250 is arranged to detect a device fault in the protection switches. If the working optical switch 1525 or 1528 fails, the monitor circuit controls the spare switch 1526 or 1527 to divert the received signal from the failed device.

What is claimed is:

1. A communications network comprising:
    a plurality of transmission links; and
    a plurality of nodes for interconnecting said transmission links to form first and second working rings and first and second protection rings in a ring topology, and establishing a plurality of working paths on each of said working rings and a plurality of protection paths on each of said protection rings corresponding to said plurality of working paths in response to a failure of said working paths,
    said ring topology having an insertion point for inserting a signal from an external source into the ring topology and a termination point for terminating the inserted signal,
    a first one of said working paths of said first working ring spanning across first and second nodes of said plurality of nodes for transmission of a signal in a first direction of said ring topology,
    a second one of said working paths of said second working ring spanning across the first and second nodes for transmission of a signal in a second direction of the ring topology opposite to the first direction,
    a first one of said protection paths on said first protection ring spanning across the first and second nodes transmission of a signal in said direction of said ring topology,
    a second one of said protection paths of said second protection ring spanning across the first and second nodes for transmission of a signal in said first direction of said topology,
    said first and second respectively serving as said insertion point and said termination point of the ring topology and normally using said first and second working paths, respectively, and responsive to said second node detecting a failure of one of said first and second working paths, transmitting a command signal from said second node to said first node for instructing said first node to switch from one of said first and second working paths on which failure was detected to a corresponding one of the first and second protection paths for using said corresponding one of the first and second protection paths instead of the failed working path.

2. A communications network as claimed in claim 1, wherein first and second working paths of said plurality of working paths are assigned a first network resource and first and second protection paths of said plurality of protection paths are assigned a second network resource,
    said first node normally using said first network resource and said first working path and being responsive to a failure in said first ring for using said second network resource and said second protection path instead of said first network resource and said first working path,
    said second node normally using said second network resource and said second working path and being responsive to a failure of the second ring for using said first network resource and said first protection path instead of the second network resource and the second working path.

3. A communications network as claimed in claim 1, wherein first and second working paths of said plurality of working paths are assigned first and second network resources, respectively, and first and second protection paths of said plurality of protection paths are assigned said second and first network resources, respectively,
    said first node normally using said first network resource and said first working path and being responsive to a failure of said first ring for using said second protection path instead of said first working path,
    said second node normally using said second network resource and said second working path and being responsive to a failure of the second ring for using the first protection path instead of the second protection path.

4. A communications network as claimed in claim 2 or 3, wherein said first and second network resources are optical energy of different wavelengths.

5. A communications network comprising:
    a plurality of transmission links; and
    a plurality of nodes for interconnecting said inks to form a working ring and a protection ring in a ring topology, and establishing a plurality of working paths on said working ring and a plurality of extra traffic paths on said protection ring, one of said working paths spanning across first and second nodes of said plurality of nodes for transmission of a signal in a first of said ring topology, said ring topology having an insertion point for inserting a signal from an external source into the ring topology and a termination point for terminating the inserted signal, one of said extra traffic paths spanning across said first and second nodes for transmission of a low-priority signal in a second direction of said ring topology opposite to said first direction, said first and second nodes respectively serving as said insertion point and said termination point of the ring topology and normally using said one working path and responsive to said second node detecting a failure of said one working path, clearing said one extra traffic path establish a first protection path, transmitting a command signal from second node to said first node for instructing said first node to switch from said one working path to said first protection path and using the first protection path, clearing another extra traffic path to establish a second protection path if said first protection path is not successfully established, transmitting a command signal from said second node to said first node for instructing said first node to switch from said one working path to said second protection path and using said protection path instead of the failed working path, said first protection path having a shorter length than said second protection path.

6. A communications network comprising:

a plurality of transmission links; and a plurality of nodes for interconnecting said links to form a working ring and a protection ring in a ring topology, and establishing a plurality of working paths on said working ring and a plurality of protection paths on said protection ring corresponding to said plurality of working paths in response to a failure of said working paths, said ring topology having an insertion point for inserting a signal from an external source into the ring topology and a termination point for terminating the inserted signal, one of said working paths spanning across first and second nodes of said plurality of nodes for transmission of a signal in a first direction of said ring topology, one of said protection paths spanning said first and second nodes for transmission of a signal in a second direction of said ring topology opposite to said first direction, said first and second nodes respectively serving as said insertion point and said termination point of the ring topology and normally using said working path and responsive to said second node detecting a failure of said one working path, transmitting a command signal from said second node to said first node for instructing said first node to switch from said one working path to said one protection path for using said one protection path instead of said working path.

7. A communications network as claimed in claim 1, 2, 3, 4 or 5, wherein said second node is a destination node.

8. A communications network as claimed in claim 1, 2, 3, 4 or 5, wherein said command signal is transmitted in format in which bit positions represent information.

9. A communications network as claimed in claim 1, 2, 3, 4 or 5, wherein each of said first and second nodes comprises:

a first demultiplexer for receiving a multiplex signal from said one working path for producing drop-off signals;

a first multiplexer for multiplexing add-up signals onto said working path;

a first path switch connected between said first demultiplexer and said first multiplexer;

a second demultiplexer for receiving a multiplex signal from said one protection path for producing drop-off signals;

a second multiplexer for multiplexing add-up signals onto said one protection path;

a second path switch connected between said second demultiplexer and said second multiplexer;

a transmit protection switch;

a receive protection switch; and control circuitry for monitoring said one working path and controlling said transmit protection switch so that one of said add-up signals is coupled to said first multiplexer when no failure is detected in said one working path and coupled to said second multiplexer when a failure is detected in said one working path, and controlling said receive protection switch so that one of said drop-off signals of said first multiplexer is received when no failure is detected in said one working path and one of said drop-off signals of said second multiplexer is received when said failure is detected.

10. A communications network as claimed in claim 9, wherein said control circuitry is arranged to exchange control signals with adjacent nodes for controlling said transmit and receive protection switches.

11. A communications network as claimed in claim 10, wherein said transmit protection switch comprises:

first, second, third and fourth optical couplers respectively connected to said first, second, third and fourth output ports; and first, second, third and fourth optical switches, said first optical switch having outputs respectively coupled to said first, third and fourth optical couplers, said second optical switch having outputs respectively coupled to said second, third and fourth optical couplers, said third optical switch having outputs coupled respectively to said first and third optical couplers, said fourth optical switching having outputs respectively coupled to said second and fourth optical couplers.

12. A communications network as claimed in claim 11, wherein said transmit protection switch further comprises:

a fifth optical coupler having outputs respectively connected to said first and third optical switches; and a sixth optical coupler having outputs respectively connected to said second and fourth optical switches.

13. A communications network as claimed in claim 10, wherein said receive protection switch comprises:

first, second, third and fourth optical couplers respectively connected to said first, second, third and fourth input ports; and first, second, third and fourth optical switches, said first optical switch having inputs respectively coupled to said first, third and fourth optical couplers, said second optical switch having inputs respectively coupled to said second, third and fourth optical couplers, said third optical switch having inputs coupled respectively to said first and third optical couplers, and said fourth optical switching having inputs respectively coupled to said second and fourth optical couplers.

14. A communications network as claimed in claim 13, wherein said receive protection switch further comprises:

a fifth optical coupler having inputs respectively connected to said first and third optical switches; and a sixth optical coupler having inputs respectively connected to said second and fourth optical switches.

15. A communications network as claimed in claim 9, wherein each of said first and second demultiplexers comprises an optical demultiplexer and each of said first and second multiplexers comprises an optical multiplexer.

16. A communications network as claimed in claim 9, wherein said transmit protection switch includes first and second output ports associated with ones of said working paths and third and fourth output ports associated with ones of said protection paths, said transmit protection switch being responsive to a control signal from said control circuitry for coupling two add-up signals to said first and second output ports respectively and coupling each one of said two add-up signals to one of the third and fourth ports, wherein said receive protection switch includes first and second input ports associated with one of said working paths and third and fourth input ports associated with ones of said protection paths, said receive protection switch being responsive to a control signal from said control circuitry for receiving two drop-off signals from said first and second input ports and receiving each one of the drop-off signals from one of the third and fourth input ports.

17. A fault recovery method for a communications network, wherein the network comprises a plurality of transmission links, and a plurality of nodes for interconnecting said links to form a working ring and a protection ring in a ring topology, and establishing a plurality of working paths on said working ring and a plurality of protection paths on said protection ring corresponding to said plurality of working paths in response to a failure of said working paths, said ring topology having an insertion point for inserting a signal from an external source into the ring topology and a termination point for terminating the inserted signal, the method comprising the steps of:

a) establishing one of said working paths between source and destination nodes of said plurality of nodes for transmission of a signal in a first direction of said ring topology and establishing one of said protection paths between said source and destination nodes for transmission of a signal in a second direction of said ring topology opposite to said first direction, said source and destination nodes respectively serving as said insertion point and said termination point of the ring topology;

b) using said one working path for communication between said source and destination nodes;

c) monitoring said working path at said destination node;

d) transmitting a switching command message from said destination node to said source node if a failure is detected in said one working path for instructing said source node to switch from said working path to said one protection path; and e) using said one protection path for communication between said source and destination nodes, instead of the failed working path, in response to said switching command message.

18. A fault recovery method for a communications network, wherein the network comprises a plurality of transmission links, and a plurality of nodes for interconnecting said links to form a working ring and a protection ring in a ring topology, and establishing a plurality of working paths on said working ring and a plurality of extra traffic paths on said protection ring, said ring topology having an insertion point for inserting a signal from an external source into the ring topology and a termination point for terminating the inserted signal, the method comprising the steps of:

a) establishing one of said working paths between source and destination nodes of said plurality of nodes for transmission of a signal in a first direction of said ring topology and establishing one of said extra traffic paths between said source and destination nodes for transmission of a low-priority signal in a second direction of said ring topology opposite to said first direction, said source and destination nodes respectively serving as said insertion point and said termination point of the ring topology;

b) normally using said one working path between said source and destination nodes;

c) monitoring said one working path at said destination node;

d) clearing said one extra traffic path to establish a short-haul protection path between said source and destination nodes when a failure is detected in said one working path, transmitting a command signal from said destination node to said source node for instructing said source node to switch from said one working path to said short-haul protection path and using the short-haul protection path, instead of the failed working path, between said source and destination nodes; and e) clearing another extra traffic path to establish a long-haul protection path if said short-haul protection path is not successfully established, transmitting a command signal from said destination node to said source node for instructing said source node to switch from said one working path to said long-haul protection path and using said long-haul protection path, instead of the failed working path, for communication between said source and destination nodes.

* * * * *